United States Patent
Myung et al.

(10) Patent No.: US 12,074,823 B2
(45) Date of Patent: Aug. 27, 2024

(54) METHOD OF TRANSMITTING AND RECEIVING UPLINK CONTROL CHANNEL AND APPARATUS THEREFOR

(71) Applicant: LG Electronics Inc., Seoul (KR)

(72) Inventors: Sechang Myung, Seoul (KR); Suckchel Yang, Seoul (KR); Seonwook Kim, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 17/771,700

(22) PCT Filed: Jan. 14, 2022

(86) PCT No.: PCT/KR2022/000722
§ 371 (c)(1),
(2) Date: Apr. 25, 2022

(87) PCT Pub. No.: WO2022/154568
PCT Pub. Date: Jul. 21, 2022

(65) Prior Publication Data
US 2023/0319827 A1    Oct. 5, 2023

(30) Foreign Application Priority Data

Jan. 15, 2021  (KR) .................. 10-2021-0005776
Apr. 5, 2021   (KR) .................. 10-2021-0043824
(Continued)

(51) Int. Cl.
H04W 4/00       (2018.01)
H04L 5/00       (2006.01)
(Continued)

(52) U.S. Cl.
CPC .......... H04L 5/0053 (2013.01); H04L 5/0064 (2013.01); H04L 5/0094 (2013.01);
(Continued)

(58) Field of Classification Search
CPC .... H04L 5/0053; H04L 5/0055; H04L 5/0057
See application file for complete search history.

(56) References Cited

U.S. PATENT DOCUMENTS

2015/0319777 A1* 11/2015 Seo ..................... H04B 7/15557
                                                      370/330
2016/0081107 A1*  3/2016 Yang .................... H04L 5/0053
                                                      370/280
(Continued)

FOREIGN PATENT DOCUMENTS

JP    2020507224    3/2020
JP    2020532921    11/2020
(Continued)

OTHER PUBLICATIONS

Motorola Mobility, Lenovo, "PUCCH resource allocation", 3GPP TSG RAN WG1 #90bis, Oct. 9-13, 2017, R1-1718702.
(Continued)

*Primary Examiner* — Bo Hui A Zhu
(74) *Attorney, Agent, or Firm* — BRYAN CAVE LEIGHTON PAISNER LLP

(57) ABSTRACT

Disclosed is a method of transmitting a physical uplink control channel (PUCCH) by a user equipment (UE) in a wireless communication system. The method includes receiving information related to an index of a PUCCH resource set for the PUCCH and to the number of resource blocks (RBs) for the PUCCH, and transmitting the PUCCH through a PUCCH resource based on a first RB offset. A second RB offset of the PUCCH resource set is obtained
(Continued)

based on the index, and the first RB offset is obtained by multiplying the number of RBs by the second RB offset.

14 Claims, 15 Drawing Sheets

(30) Foreign Application Priority Data

May 10, 2021 (KR) .......... 10-2021-0060140
Aug. 17, 2021 (KR) .......... 10-2021-0108242

(51) Int. Cl.
*H04W 72/0453* (2023.01)
*H04W 72/21* (2023.01)
*H04W 72/53* (2023.01)

(52) U.S. Cl.
CPC ....... *H04W 72/0453* (2013.01); *H04W 72/21* (2023.01); *H04W 72/53* (2023.01)

(56) References Cited

U.S. PATENT DOCUMENTS

| | | |
|---|---|---|
| 2019/0297618 A1 | 9/2019 | Yang et al. |
| 2020/0186311 A1 | 6/2020 | Xu et al. |
| 2022/0200756 A1 | 6/2022 | Raghavan et al. |
| 2022/0407631 A1 | 12/2022 | El Hamss et al. |
| 2022/0408428 A1 | 12/2022 | Tian et al. |

FOREIGN PATENT DOCUMENTS

| | | |
|---|---|---|
| KR | 1020190099387 A | 8/2019 |
| KR | 1020200042025 A | 4/2020 |
| WO | 2019193737 | 10/2019 |
| WO | 2020108333 A1 | 6/2020 |

OTHER PUBLICATIONS

Qualcomm Incorporated, "Remaining issues for resource allocation for PUCCH", 3GPP TSG RAN WG1 Meeting AH 1801, Jan. 22-26, 2018, R1-1800874.
Nec, "PUCCH resource allocation prior to RRC configuration", 3GPP TSG RAN WG1 NR #92bis, Apr. 16-20, 2018, R1-1804115.
Huawei, HiSilicon, "PHY design in 52.6-71 GHz using NR waveform", 3GPP TSG RAN WG1 Meeting #102-e, Aug. 17-28, 2020, R1-2005241.
Ericsson, "On NR operations in 52.6 to 71 GHz", 3GPP TSG-RAN WG1 Meeting #103-e, Oct. 26-Nov. 13, 2020, R1-2007982.
LG Electronics, "Consideration on required physical layer changes to support NR above 52.6 GHz", 3GPP TSG RAN WG1 #103-e, Oct. 26-Nov. 13, 2020, R1-2009653.
Korean Notice of Allowance for Application No. 10-2022-7015186 dated Apr. 25, 2023.
US Office Action for U.S. Appl. No. 17/983,067 dated Apr. 4, 2023.
Nokia, Nokia Shanghai Bell "Required changes to NR using existing DL/UL NR waveform," 3GPP TSG RAN WG1 #103, R1-2007926, e-Meeting, Oct. 26-Nov. 13, 2020.
NTT Docomo, Inc., "Potential Enhancements for NR on 52.6 to 71 GHz," 3GPP TSG RSN WG1 #103, R1-2008549, e-Meeting, Oct. 26-Nov. 13, 2020.
CATT, "Remaining issues on UCI enhancements", 3GPP TSG RAN WG1 #102-e, Aug. 17-28, 2020, R1-2005673.
Samsung, "Corrections on Ultra Reliable Low Latency Communications Enhancements", Change Request, 3GPP TSG-RAN WG1 Meeting #102-e, Aug. 17-28, 2020, R1-2007471.

* cited by examiner (a) Carrier aggregation between L-band and U-band (b) Standalone U-band(s)

RB assignment information for PUSCH: {Interlace #2, RB set #1} => Intersection of Interlace # and RB set #1

(a) Case 1: one SB index is indicated via RA information for PUSCH

RB assignment information for PUSCH: {Interlace #2, RB sets #1/#2} =>
=> Intersection of Interlace # and RB set #1/GB #2/RB set #1

(a) Case 2: consecutive SB index is indicated via RA information for PUSCH

METHOD OF TRANSMITTING AND RECEIVING UPLINK CONTROL CHANNEL AND APPARATUS THEREFOR

This application is the National Stage filing under 35 U.S.C. 371 of International Application No. PCT/KR2022/000722 filed on Jan. 14, 2022, which claims priority to Korean Patent Application Nos. 10-2021-0005776 filed on Jan 15, 2021; 10-2021-0043824 filed on Apr. 5, 2021; 10-2021-0060140 filed on May 10, 2021 and 10-2021-0108242 filed on Aug. 17, 2021, the contents of which are all hereby incorporated by reference herein in their entirety.

TECHNICAL FIELD

The present disclosure relates to a method of transmitting and receiving an uplink control channel and an apparatus therefor. More specifically, the present disclosure relates to a method of determining a physical uplink control channel (PUCCH) resource according to an initial PUCCH resource set in a high-frequency unlicensed band above 52.6 GHz, and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present disclosure is to provide a method of transmitting and receiving an uplink control channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided is a method of transmitting a physical uplink control channel (PUCCH) by a user equipment (UE) in a wireless communication system, including receiving information related to an index of a PUCCH resource set for the PUCCH and to the number of resource blocks (RBs) for the PUCCH, and transmitting the PUCCH through a PUCCH resource based on a first RB offset. A second RB offset of the PUCCH resource set may be obtained based on the index, and the first RB offset may be obtained by multiplying the number of RBs by the second RB offset.

The PUCCH may be based on PUCCH format 0 or PUCCH format 1.

The information may be received through a system information block (SIB).

The PUCCH resource set may be an initial PUCCH resource set used before a dedicated PUCCH resource set for the UE is configured.

The PUCCH may be transmitted in a frequency band above 52.6 GHz.

The PUCCH may be transmitted through a plurality of RBs.

In another aspect of the present disclosure, provided herein is a user equipment (UE) for transmitting a physical uplink control channel (PUCCH) in a wireless communication system, including at least one transceiver; at least one processor; and at least one memory operably connected to the at least one processor and configured to store instructions causing, when executed, the at least one processor to perform an operation. The operation includes receiving, through at least one transceiver, information related to an index of a PUCCH resource set for the PUCCH and to the number of resource blocks (RBs) for the PUCCH, and transmitting, through at least one transceiver, the PUCCH through a PUCCH resource based on a first RB offset. A second RB offset of the PUCCH resource set may be obtained based on the index, and the first RB offset may be obtained by multiplying the number of RBs by the second RB offset.

The PUCCH may be based on PUCCH format 0 or PUCCH format 1.

The information may be received through a system information block (SIB).

The PUCCH resource set may be an initial PUCCH resource set used before a dedicated PUCCH resource set for the UE is configured.

The PUCCH may be transmitted in a frequency band above 52.6 GHz.

The PUCCH may be transmitted through a plurality of RB.

In another aspect of the present disclosure, provided herein is an apparatus for transmitting a physical uplink control channel (PUCCH) in a wireless communication system, including at least one processor; and at least one memory operably connected to the at least one processor and configured to store instructions causing, when executed, the at least one processor to perform an operation. The operation includes receiving information related to an index of a PUCCH resource set for the PUCCH and to the number of resource blocks (RBs) for the PUCCH, and transmitting the PUCCH through a PUCCH resource based on a first RB offset. A second RB offset of the PUCCH resource set may be obtained based on the index, and the first RB offset may be obtained by multiplying the number of RBs by the second RB offset.

In another aspect of the present disclosure, provided herein is a computer-readable storage medium including at least one computer program causing at least one processor to perform an operation. The operation includes receiving information related to an index of a PUCCH resource set for the PUCCH and to the number of resource blocks (RBs) for the PUCCH, and transmitting the PUCCH through a PUCCH resource based on a first RB offset. A second RB offset of the PUCCH resource set may be obtained based on the index, and the first RB offset may be obtained by multiplying the number of RBs by the second RB offset.

In another aspect of the present disclosure, provided herein is a method of receiving a physical uplink control channel (PUCCH) by a base station (BS) in a wireless communication system, including transmitting information related to an index of a PUCCH resource set for the PUCCH and to the number of resource blocks (RBs) for the PUCCH, and receiving the PUCCH through a PUCCH resource based on a first RB offset. The index may be used to represent a second RB offset of the PUCCH resource set, and the first RB offset may be obtained by multiplying the number of RBs by the second RB offset.

In another aspect of the present disclosure, provided herein is a base station (BS) for receiving a physical uplink control channel (PUCCH) in a wireless communication system, including at least one transceiver; at least one processor; and at least one memory operably connected to the at least one processor and configured to store instructions causing, when executed, the at least one processor to perform an operation. The operation includes transmitting, through the at least one transceiver, information related to an index of a PUCCH resource set for the PUCCH and to the number of resource blocks (RBs) for the PUCCH, and receiving, through the at least one transceiver, the PUCCH through a PUCCH resource based on a first RB offset. The index may be used to represent a second RB offset of the PUCCH resource set, and the first RB offset may be obtained by multiplying the number of RBs by the second RB offset.

Advantageous Effects

According to the present disclosure, PUCCH transmission with efficient and appropriate coverage may be performed by improving a resource allocation scheme of legacy PUCCH formats based on regulatory requirements such as a maximum output power limit and power spectral density (PSD) in order to support a new radio (NR) system in a high frequency band above 52.6 GHz.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
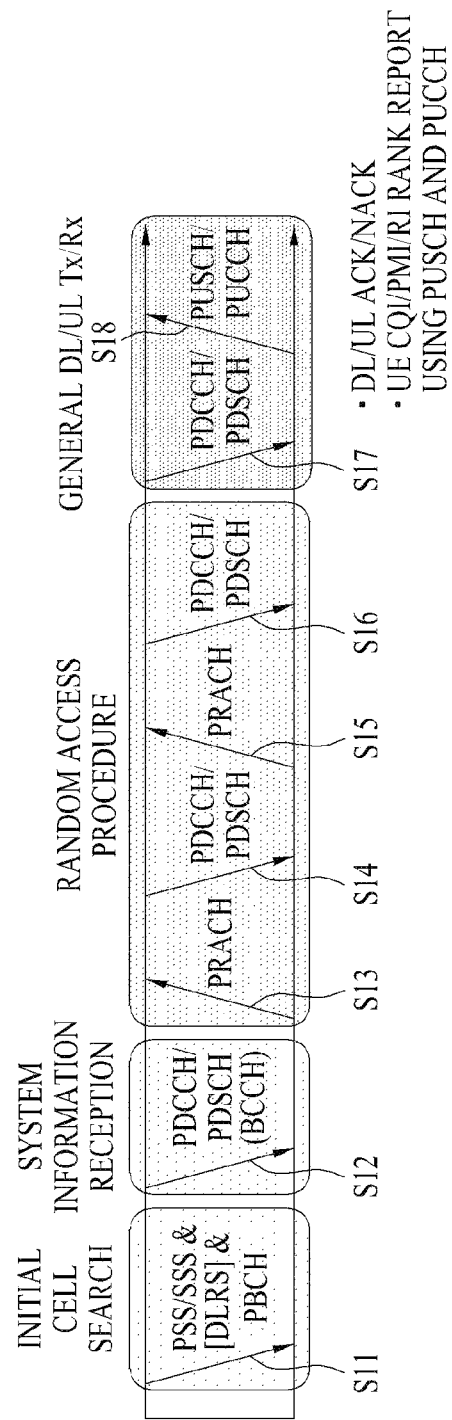
FIG. 1 illustrates physical channels and a general signal transmission method using the physical channels in a 3rd generation partnership project (3GPP) system as an exemplary wireless communication system.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
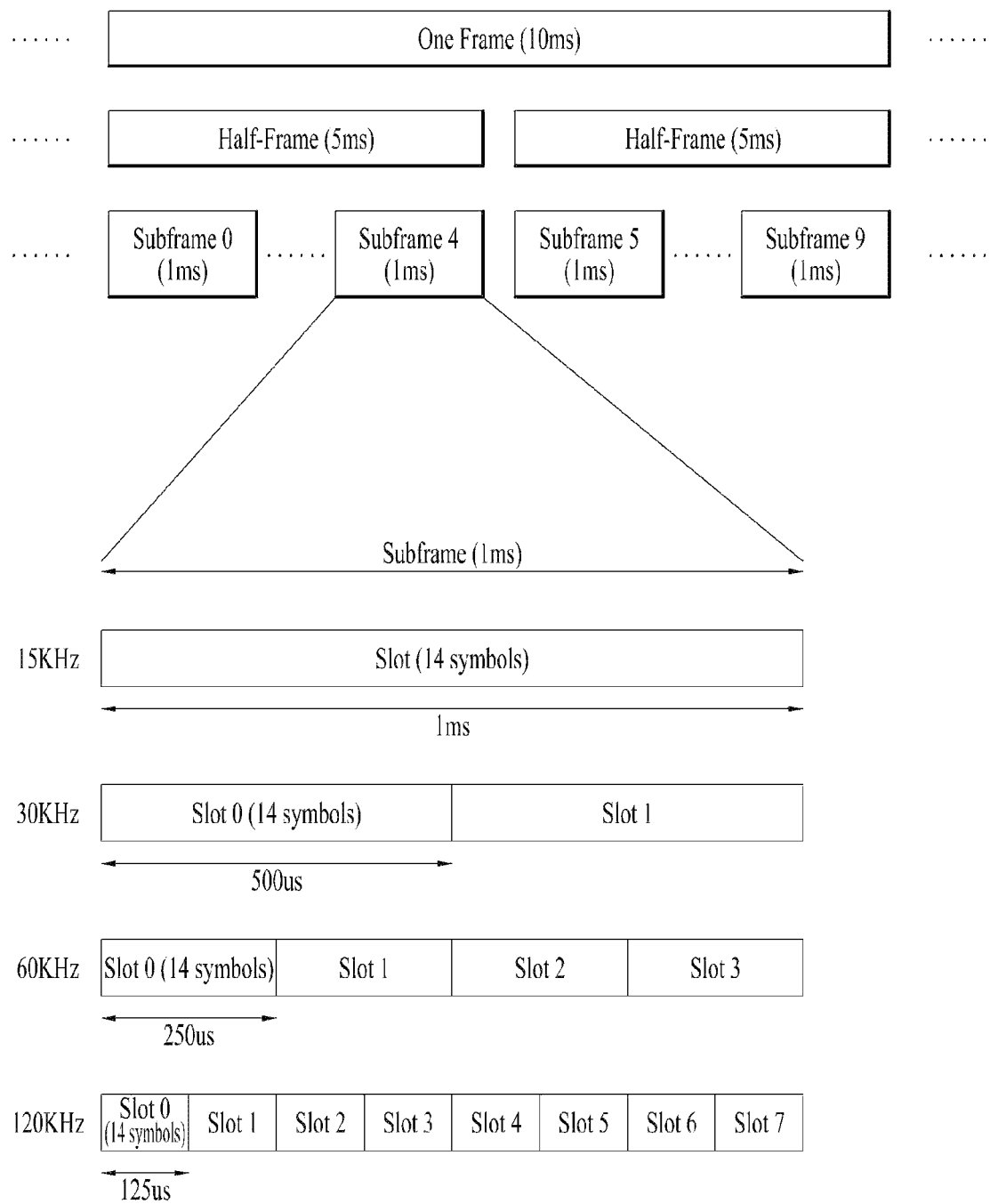
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |

TABLE 1-continued

| SCS (15*2^u) | Nslotsymb | Nframe, uslot | Nsubframe, uslot |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: number of symbols in a slot
*Nframe, uslot: number of slots in a frame
*Nsubframe, uslot: number of slots in a subframe Table 2 illustrates that the number of symbols per slot, the number of slots per frame, and the number of slots per subframe vary according to SCSs in an extended CP case.

TABLE 2

| SCS (15*2^u) | Nslotsymb | Nframe, uslot | Nsubframe, uslot |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHZ | 60, 120, 240 kHz |

Figure 3:
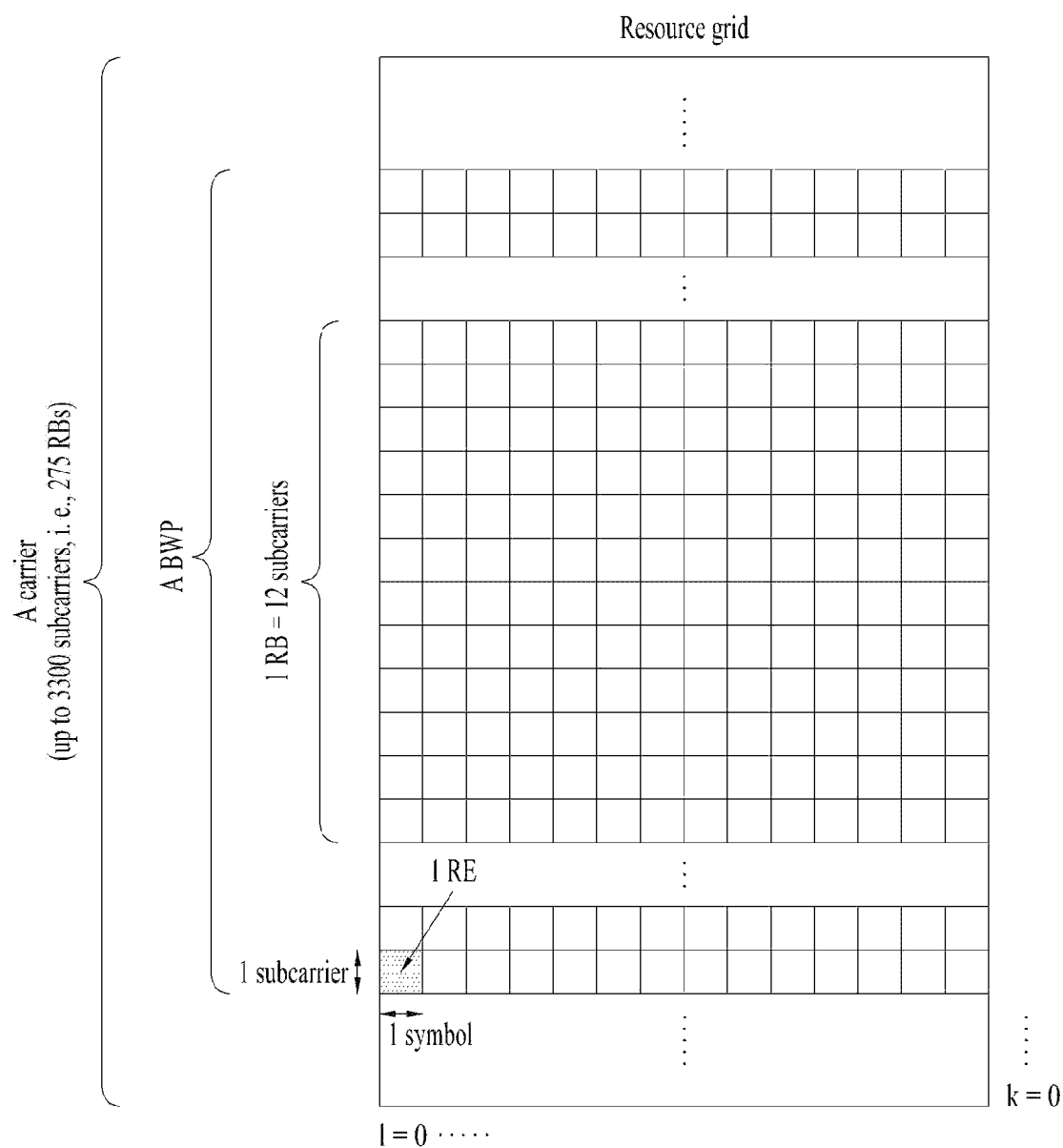
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs for one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

Figure 4:
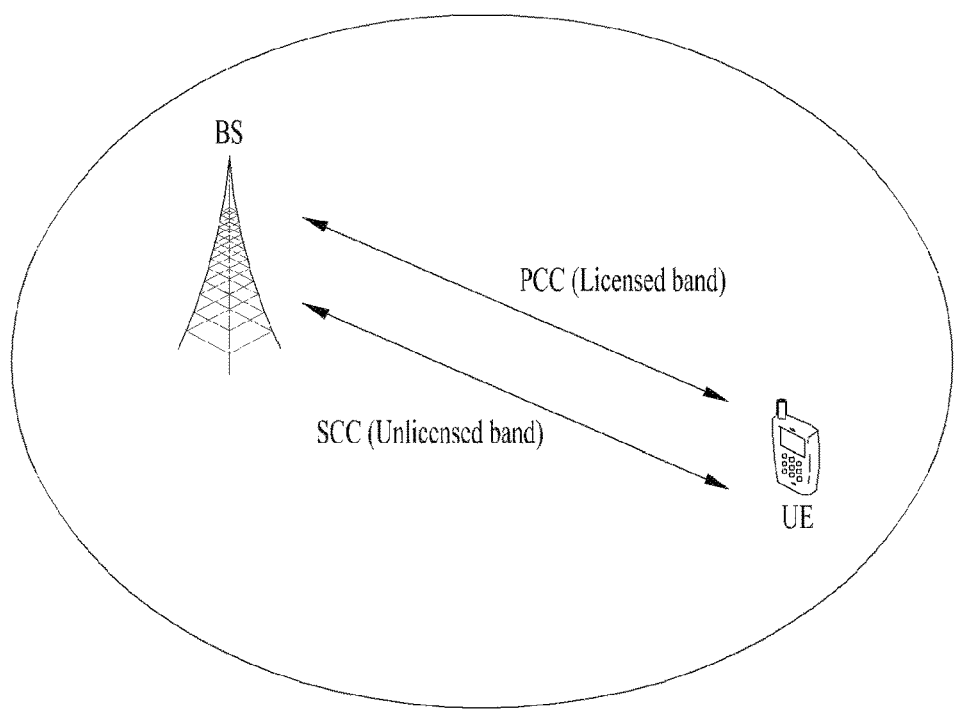
FIG. 4 illustrates a wireless communication system supporting an unlicensed band.
Figure 4:
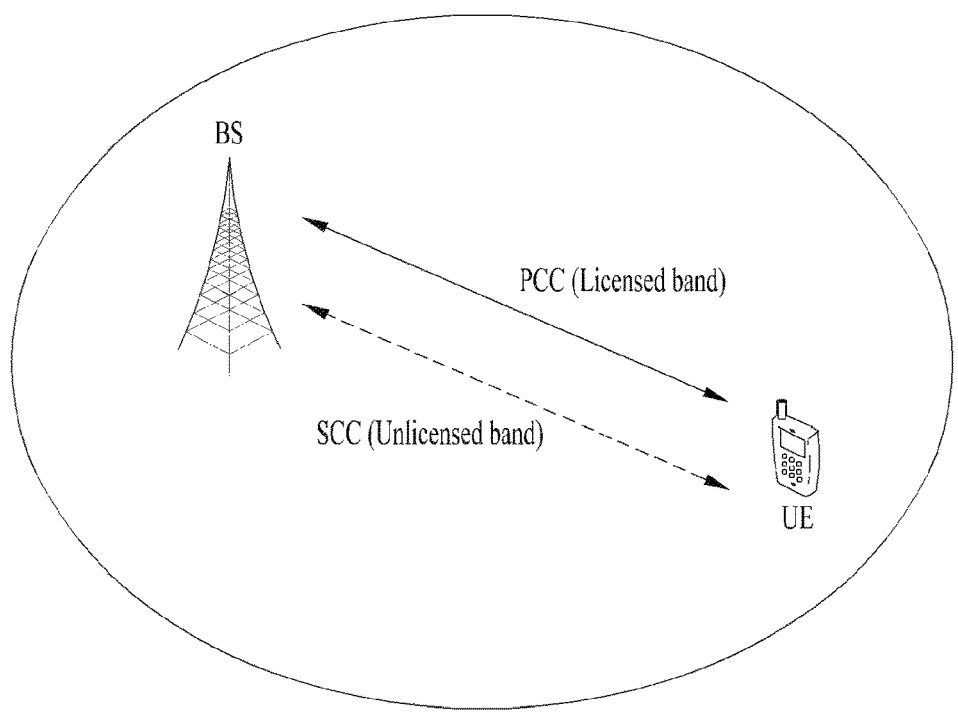

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 4(a), the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 4(b). In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel A basic sensing unit is a sensing slot with a duration of Tsl=9 us. The BS or the UE senses the slot during a sensing slot duration. When power detected for at least 4 us within the sensing slot duration is less than an energy detection threshold $X_{thresh}$, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT. The COT may be shared for transmission between the BS and corresponding UE(s).

The COT may be shared for transmission between the BS and corresponding UE(s).

Specifically, sharing a UE-initiated COT with the BS may mean an operation in which the UE assigns a part of occupied channels to the BS through random backoff-based LBT (e.g., Category 3 (Cat-3) LBT or Category 4 (Cat-4) LBT) and the BS performs DL transmission using a remaining COT of the UE, when it is confirmed that a channel is idle by success of LBT after performing LBT without random backoff (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels to the UE through random backoff-based LBT (e.g., Cat-3 LBT or Cat-4 LBT) and the UE performs UL transmission using a remaining COT of the BS, when it is confirmed that a channel is idle by success of LBT after performing LBT without random backoff (e.g., Cat-1 LBT or Cat-2 LBT) using a timing gap occurring before UL transmission start from a DL transmission end timing of the BS.

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 5:
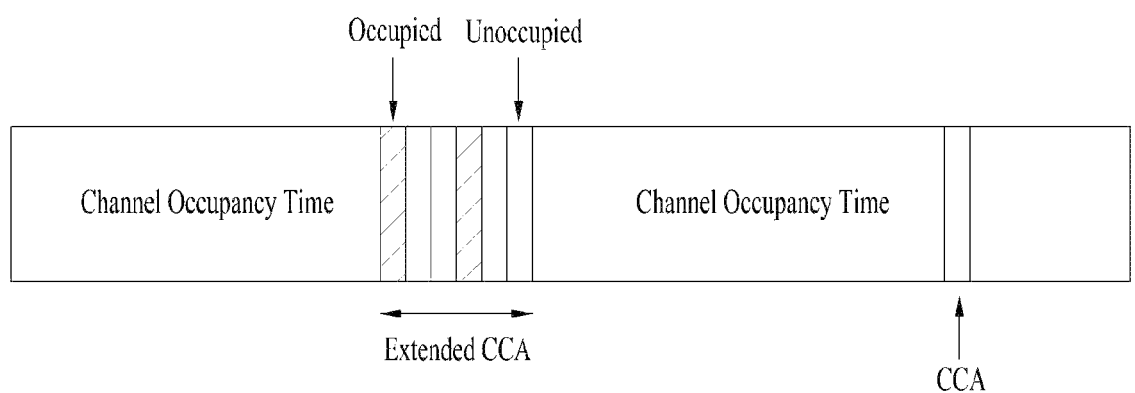
FIG. 5 illustrates an exemplary method of occupying resources in an unlicensed band.

FIG. 5 illustrates an exemplary method of occupying resources in an unlicensed band.

Referring to FIG. 5, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel Otherwise, the communication node may determine that the channel is idle. When determining that the channel is idle, the communication node may start to transmit a signal in the unlicensed band. CAP may be replaced with LBT.

Table 4 describes an exemplary CAP supported in NR-U.

TABLE 4

| | Type | Explanation |
|---|---|---|
| DL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |
| UL | Type 1 CAP | CAP with random backoff time duration spanned by the sensing slots that are sensed to be idle before a downlink transmission(s) is random |
| | Type 2 CAP Type 2A, 2B, 2C | CAP without random backoff time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.
- PUSCH/SRS transmission(s) scheduled and/or configured by BS
- PUCCH transmission(s) scheduled and/or configured by BS
- Transmission(s) related to random access procedure (RAP)

Figure 6:
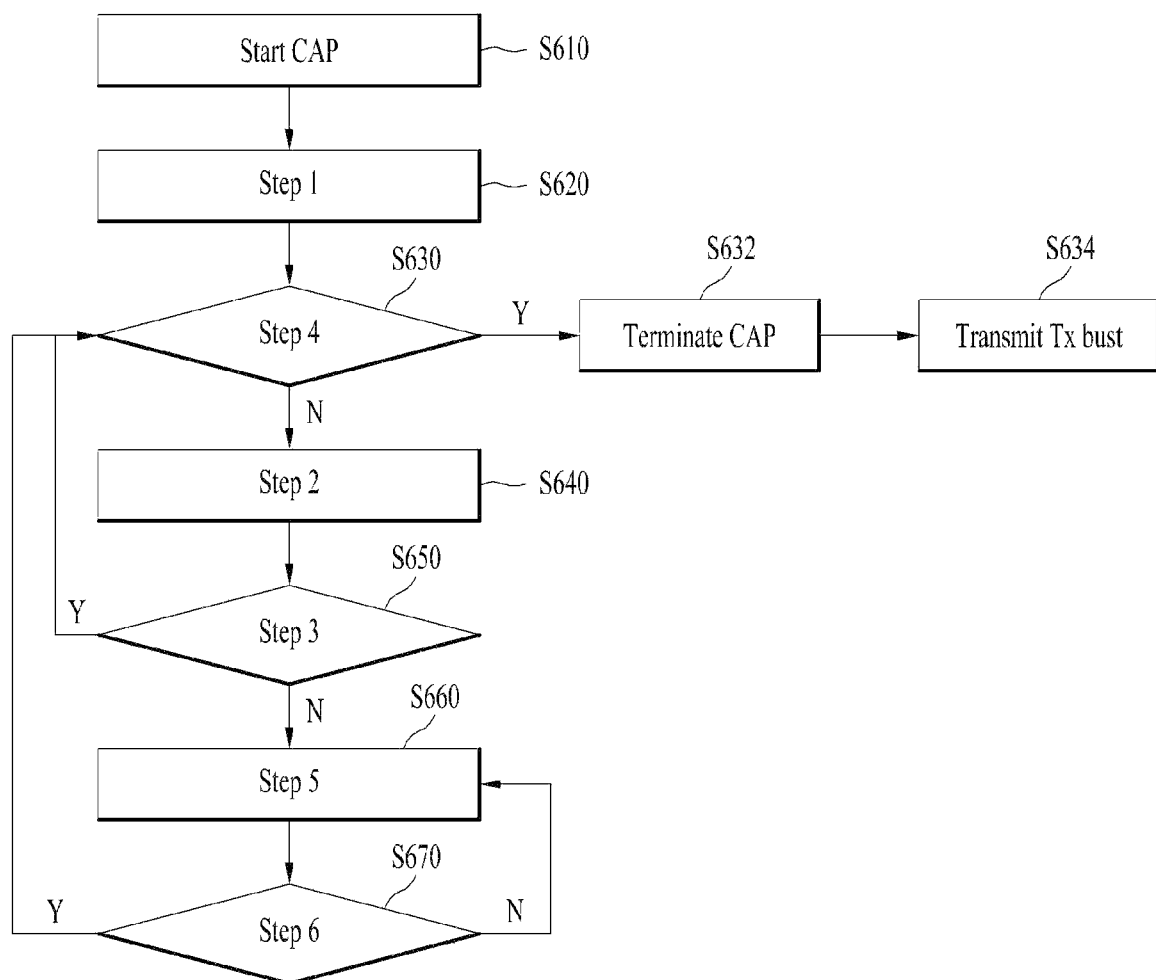
FIG. 6 illustrates an exemplary channel access procedure of a UE for UL signal transmission in an unlicensed band applicable to the present disclosure.

FIG. 6 illustrates a Type 1 CAP among CAPs of the UE for UL signal transmission in an unlicensed band applicable to the present disclosure.

First, UL signal transmission in the unlicensed band will now be described with reference to FIG. 6.

The UE may sense whether a channel is idle for a sensing slot duration in a defer duration Td. After a counter N is decremented to 0, the UE may perform a transmission (S634). The counter N is adjusted by sensing the channel for additional slot duration(s) according to the following procedure.

Step 1) Set $N=N_{init}$ where $N_{init}$ is a random number uniformly distributed between 0 and CWp, and go to step 4 (S620).

Step 2) If N>0 and the UE chooses to decrement the counter, set N=N−1 (S640).

Step 3) Sense the channel for an additional slot duration, and if the additional slot duration is idle (Y), go to step 4. Else (N), go to step 5 (S650).

Step 4) If N=0 (Y) (S630), stop CAP (S632). Else (N), go to step 2.

Step 5) Sense the channel until a busy sensing slot is detected within the additional defer duration Td or all slots of the additional defer duration Td are sensed as idle (S660).

Step 6) If the channel is sensed as idle for all slot durations of the additional defer duration Td (Y), go to step 4. Else (N), go to step 5 (S670).

Table 5 illustrates that mp, a minimum CW, a maximum CW, a maximum channel occupancy time (MCOT), and an allowed CW size applied to a CAP vary according to channel access priority classes.

TABLE 5

| Channel Access Priority Class (p) | mp | CWmin, p | CWmax, p | Tulmcot, p | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511,1023} |

The defer duration Td includes a duration Tf (16 us) immediately followed by mp consecutive slot durations where each slot duration Tsl is 9 us, and Tf includes a sensing slot duration Tsl at the start of the 16-us duration. CWmin,p<=CWp<=CWmax,p. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 us). Tshort_dl includes a duration Tf (=16 us) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 us). In the Type 2B UL CAP, Tf includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports configured grant type 1 and configured grant type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a configured grant, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a configured grant and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

Autonomous uplink (AUL) of LTE LAA and a configured grant of NR show a big difference in terms of a method of transmitting HARQ-ACK feedback for a PUSCH that the UE has transmitted without receiving the UL grant and in terms of the presence or absence of UCI transmitted along with the PUSCH. While a HARQ process is determined by an equation of a symbol index, a symbol periodicity, and the number of HARQ processes in the configured grant of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the configured grant of NR, the BS identifies the UE by time/frequency resources and DMRS resources used by the UE for PUSCH transmission, whereas in the case of LTE LAA, the BS identifies the UE by a UE ID explicitly included in the AUL UCI transmitted together with the PUSCH as well as the DMRS resources.

Figure 7:
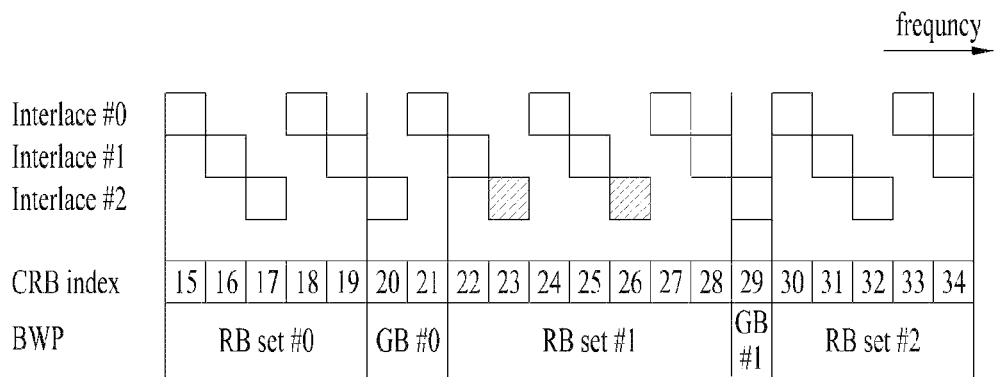
FIG. 7 is a diagram for explaining a resource allocation method for UL transmission in a shared spectrum applicable to the present disclosure.
Figure 7:
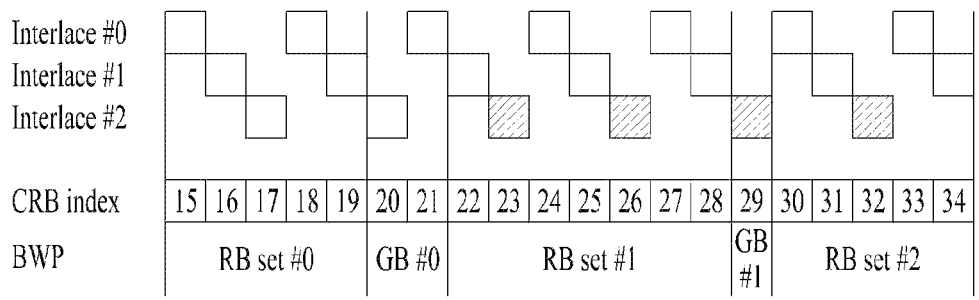

FIG. 7 illustrates resource assignment for UL transmission in a shared spectrum.

Referring to FIG. 7(a), RBs belonging to interlace #1 in RB set #1 may be determined as a PUSCH resource based on resource assignment information for a PUSCH indicating {interlace #1, RB set #1}. That is, RBs corresponding to the intersection of {interlace #1, RB set #1} may be determined as the PUSCH resource. Referring to FIG. 7(b), RBs belonging to interlace #2 in RB sets #1 and #2 may be determined as the PUSCH resource based on the resource assignment information for the PUSCH indicating {interlace #2, RB sets #1 and #2}. In this case, a guide band (GB) (i.e., GB #1) between RB set #1 and RB set #2 may also be used as the PUSCH transmission resource. That is, RBs corresponding to the intersection of {interlace #1, RB sets #1 and #2, GB #1} may be determined as the PUSCH resource. In this case, a GB (i.e., GB #0) which is not between RB set #1 and RB set #2 is not used as the PUSCH transmission resource even if the GB is adjacent to RB sets #1 and #2.

Figure 8:
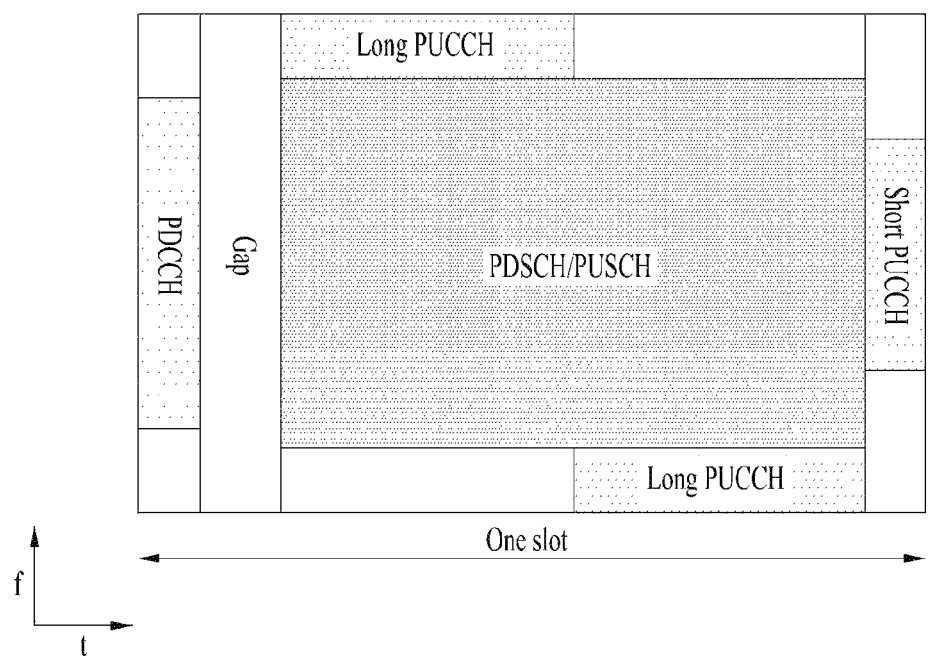
FIG. 8 illustrates exemplary mapping of physical channels in a slot.

FIG. 8 illustrates exemplary mapping of physical channels in a slot.

A DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. A time gap for DL-to-UL or UL-to-DL switching may be defined between a control region and the data region. A PDCCH may be transmitted in the DL control region, and a PDSCH may be transmitted in the DL data region. Some symbols at the time of switching from DL to UL in a slot may be configured as the time gap.

UL Channel Structures

A UE transmits a related signal to the BS on a UL channel, which will be described later, and the BS receives the related signal from the UE through the UL channel to be described later.

(1) Physical Uplink Control Channel (PUCCH)

The PUCCH carries UCI, HARQ-ACK and/or scheduling request (SR), and is divided into a short PUCCH and a long PUCCH according to the PUCCH transmission length.

The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI: feedback information for a DL channel. Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration. PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 2-symbol PUCCH format 2, frequency hopping may be activated.

PUCCH format 3 does not support UE multiplexing in the same PRBs, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs, and conveys UCI of more than 2 bits. In other words, PUCCH resources of PUCCH format 3 include an OCC. Modulation symbols are transmitted in TDM with the DMRS.

(2) Physical Uplink Shared Channel (PUSCH)

The PUSCH carries UL data (e.g., UL-shared channel transport block (UL-SCH TB)) and/or UL control information (UCI), and is transmitted based a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE transmits the PUSCH by applying transform precoding. For example, when transform precoding is not allowed (e.g., transform precoding is disabled), the UE may transmit the PUSCH based on the CP-OFDM waveform. When transform precoding is allowed (e.g., transform precoding is enabled), the UE may transmit the PUSCH based on the CP-OFDM waveform or the DFT-s-OFDM waveform. PUSCH transmission may be dynamically scheduled by the UL grant in the DCI or may be semi-statically scheduled based on higher layer (e.g., RRC) signaling (and/or Layer 1 (L1) signaling (e.g., PDCCH)) (configured grant). PUSCH transmission may be performed on a codebook basis or a non-codebook basis.

Figure 9:
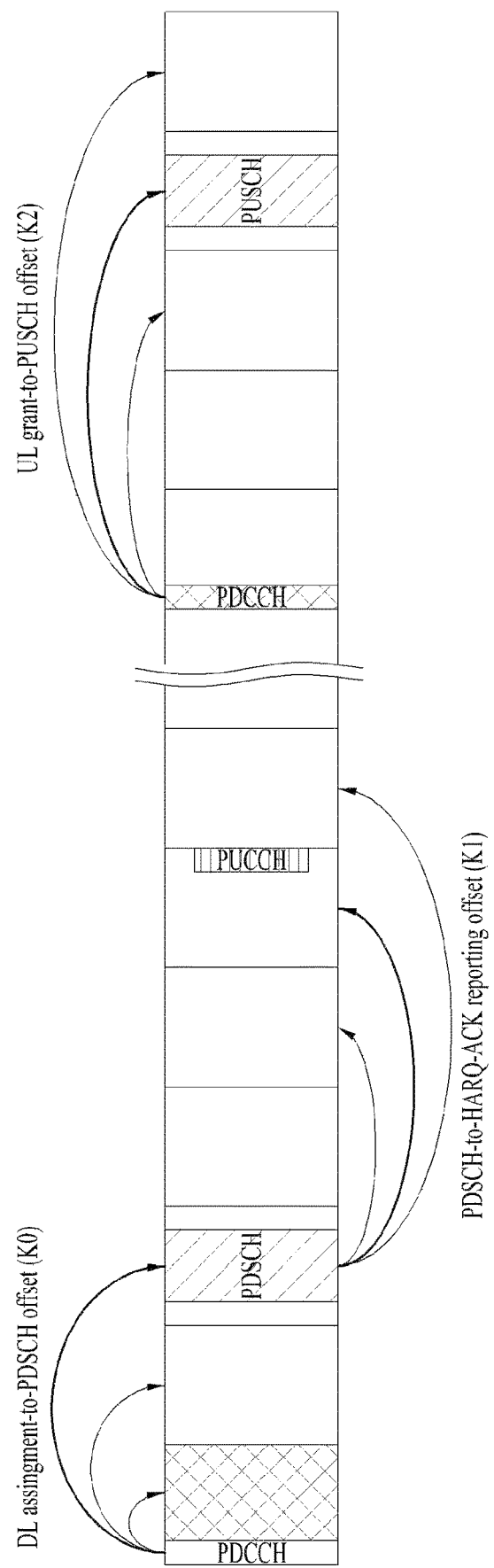
FIG. 9 illustrates a physical uplink control channel (PUCCH) and physical uplink shared channel (PUSCH) transmission process.

FIG. 9 is a diagram for explaining a HARQ transmission timing, and a PUSCH transmission timing and assignment method.

HARQ-ACK is information indicating whether the UE has successfully received a physical DL channel Upon successfully receiving the physical DL channel, the UE feeds back ACK to the BS and, otherwise, the UE feeds back NACK to the BS. In NR, HARQ supports 1-bit HARQ-ACK feedback per transport block. FIG. 9 illustrates an example of a HARQ-ACK timing K1.

In FIG. 9, K0 represents the number of slots from a slot with a PDCCH carrying DL assignment (i.e., DL grant) to a slot with corresponding PDSCH transmission, K1 represents the number of slots from a slot with a PDSCH to a slot with corresponding HARQ-ACK transmission, and K2 represents the number of slots from a slot with a PDCCH carrying a UL grant to a slot with corresponding PUSCH transmission. That is, K0, K1, and K2 may be briefly summarized as listed Table 7 below.

TABLE 7

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

The BS may provide a HARQ-ACK feedback timing to the UE dynamically by DCI or semi-statically by RRC signaling. The NR system supports different minimum HARQ processing times for UEs. A HARQ processing time includes delay between a DL data reception timing and a corresponding HARQ-ACK transmission timing and delay between a UL grant reception timing and a corresponding UL data transmission timing. The UE transmits information about the capability of a minimum HARQ processing time thereof to the BS. From the viewpoint of the UE, HARQ ACK/NACK feedback for a plurality of DL transmissions in the time domain may be transmitted in one UL data/control region. A timing between DL data reception and corresponding ACK is indicated by the DCI.

Unlike the LTE system in which a transport block (TB)-based or codeword-based HARQ procedure is performed, the NR system supports code block group (CBG)-based transmission of single-bit/multi-bit HARQ-ACK feedback. A TB may be mapped to one or more code blocks (CBs) according to the size of the TB. For example, in a channel coding procedure, a cyclic redundancy check (CRC) code is attached to the TB. If a CRC-attached TB is not larger than a certain size, the CRC-attached TB corresponds to one CB. However, if the CRC-attached TB is larger than the certain size, the CRC-attached TB is segmented into a plurality of CBs. In the NR system, the UE may be configured to receive CBG-based transmissions, and retransmission may be scheduled to carry a subset of all CBs of the TB.

Referring to FIG. 9, the UE may detect a PDCCH in slot #n. The PDCCH includes DL scheduling information (e.g., DCI format 1_0 and/or DCI format 1_1). The PDCCH indicates a DL assignment-to-PDSCH offset K0 and a PDSCH-to-HARQ-ACK reporting offset K1. For example, DCI format 1_0 and DCI format 1_1 may include the following information.

- Frequency domain resource assignment: indicates an RB resource assigned to a PDSCH (e.g. one or more (dis)continuous RBs)
- Time domain resource assignment: Time domain resource assignment: indicates K0 and the starting position (e.g., OFDM symbol index) and length (e.g., the number of OFDM symbols) of a PDSCH in a slot.
- PDSCH-to-HARQ_feedback timing indicator: indicates K1.
- HARQ process number (4 bits): indicates a HARQ process identity (ID) for data (e.g., a PDSCH or a TB).
- PUCCH resource indicator (PRI): indicates a PUCCH resource to be used for UCI transmission among a plurality of PUCCH resources in a PUCCH resource set.

Next, the UE may receive a PDSCH in slot #(n+K0) according to scheduling information of slot #n and then transmit UCI on a PUCCH in slot #(n+K1). The UCI includes a HARQ-ACK response to the PDSCH. In the case in which the PDSCH is configured to carry a maximum of one TB, the HARQ-ACK response may be configured in one bit. In the case in which the PDSCH is configured to carry up to two TBs, the HARQ-ACK response may be configured as two bits if spatial bundling is not configured and as one bit if spatial bundling is configured. When slot #(n+K1) is designated as a HARQ-ACK transmission timing for a plurality of PDSCHs, UCI transmitted in slot #(n+K1) includes HARQ-ACK responses to the plurality of PDSCHs.

Referring to FIG. 9, the UE may detect a PDCCH in slot #n. The PDCCH includes UL scheduling information (e.g., DCI format 0_0 and/or DCI format 0_1). DCI format 0_0 and DCI format 0_1 may include the following information.

- Frequency domain resource assignment: indicates an RB set assigned to a PUSCH.
- Time domain resource assignment: indicates a slot offset K2 and the starting position (e.g., symbol index) and length (e.g., the number of OFDM symbols) of a PUSCH in a slot. The starting symbol and length may be indicated by a start and length indicator value (SLIV) or may be indicated individually.

Thereafter, the UE may transmit the PUSCH in slot #(n+k2) according to the scheduling information of slot #n. Here, the PUSCH includes a UL-SCH TB.

PUCCH Resource Set

In order to transmit UCI through a PUCCH, the UE may receive a dedicated PUCCH resource configuration. This dedicated PUCCH resource configuration may include information about a PUCCH resource set. The information about the PUCCH resource set may include, for example, N PUCCH resources, a PUCCH format for each of the N PUCCH resources, a starting symbol, a PUCCH resource duration, a physical resource block (PRB) offset, and a cyclic shift (CS) set.

For example, the first PUCCH resource set of the dedicated PUCCH resource configuration may include a maximum of 32 PUCCH resources and the remaining PUCCH resource set of the dedicated PUCCH resource configuration may include a maximum of 8 PUCCH resources.

If an interlace is indicated to be used for PUCCH transmission, the UE may transmit a PUCCH using frequency hopping. If the interlace is not indicated to be used, the UE may transmit the PUCCH without frequency hopping.

Upon receiving downlink control information (DCI) scheduling a PDSCH and transmitting HARQ-ACK through the PUCCH as a response to the DCI, the UE may determine any one of 16 PUCCH resources included in the PUCCH resource set to transmit HARQ-ACK through the determined PUCCH resource. For example, the UE determines an index of a PUCCH resource, based on the number of control channel elements (CCEs) in a control resource set (CORE-SET) of a PDCCH including the DCI scheduling the PDSCH, an index of the first CCE of the PDCCH, and a value of a PUCCH resource indicator field included in the DCI scheduling the PDSCH. Then, the UE may transmit HARQ-ACK through a PUCCH resource corresponding to the determined index.

However, if the UE does not receive the dedicated PUCCH resource configuration (e.g., before the BS transmits the dedicated PUCCH resource configuration), the UE may acquire an index corresponding to any one of indexes in rows of [Table 8] below from pucch-ResourceCommon.

TABLE 8

| Index | PUCCH format | First symbol | Number of symbols | PRB offset | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The UE may determine an index of a PRB for PUCCH transmission, based on a PRB offset of the PUCCH resource set corresponding to the acquired index of the PUCCH resource set, the index of the PUCCH resource set, the number of initial CS indexes included in a set of initial CS indexes, and a BWP size.

The UE may transmit the PUCCH through a PUCCH resource according to a PUCCH format, a starting symbol, and a symbol duration which correspond to the determined index of the PRB and the index of the PUCCH resource set.

In a Rel-15 NR PUCCH, 5 PUCCH formats (PUCCH format 0/1/2/3/4) are defined for each purpose in consideration of payload size, coverage, and delay. In Rel-16 NR in unlicensed spectrum (NR-U), a new PUCCH resource allocation method based on an interlaced RB allocation method in the Rel-15 PUCCH formats is used to satisfy regulatory requirements of an unlicensed band such as occupied channel bandwidth (OCB) and power spectral density (PSD). Likewise, in Rel-17, in order to support NR in a high-frequency band above 52.6 GHz, it is necessary to improve a specific signal and channel design of legacy Rel-15/16. The present disclosure proposes a method for enhancing a resource allocation method of legacy PUCCH formats in consideration of regulatory requirements such as a maximum output power limit and a PSD limit in a high-frequency unlicensed band above 52.6 GHz.

NR supports a plurality of numerologies (e.g., subcarrier spacings (SCSs)) to support various 5G services. For example, when an SCS is 15 kHz, a wide area in traditional cellular bands is supported. When the SCS is 30 kHz or 60 kHz, a dense-urban, lower latency, and wider carrier BW are supported. When the SCS is above 60 kHz, BW greater than 24.25 GHz is supported to overcome phase noise.

An NR frequency band defines two types of frequency ranges FR1 and FR2. FR1 and FR2 may be configured as shown in [Table 3] above. FR2 may represent millimeter wave (mmW).

A band (e.g., band of 52.6 GHz to 114.25 GHz, particularly, 71 GHz) higher than the above-mentioned frequency bands is referred to as FR4. An area of FR4 may be used as an unlicensed band.

A specific region/country may include restrictions on PSD and maximum output power in regulations regarding the unlicensed band when a specific node transmits signals. For example, a partial band (e.g., band 75, c1) of the FR4 area imposes restrictions on transmission that should satisfy a maximum output power of 40 dBm and a PSD of 23 dBm and 1 MHz.

To transmit the PUCCH using maximum transmission power while satisfying the proposed requirements, it is necessary to enhance a resource allocation method of the legacy PUCCH formats. [Table 9] lists the total number of PRBs according to an SCS and BW defined in the FR2 area.

TABLE 9

| SCS (kHz) | 50 MHz $N_{RB}$ | 100 MHz $N_{RB}$ | 200 MHz $N_{RB}$ | 400 MHZ $N_{RB}$ |
|---|---|---|---|---|
| 60 | 66 | 132 | 264 | N.A |
| 120 | 32 | 66 | 132 | 264 |

The total number T of PRBs expected when the SCS is increased to 240 kHz, 480 kHz, or 960 kHz and BW is increased to 800 MHz, 1600 MHz, and 2000 MHz, based on [Table 9], is listed in [Table 10].

TABLE 10

| SCS (kHz) | 50 MHz $N_{RB}$ | 100 MHz $N_{RB}$ | 200 MHz $N_{RB}$ | 400 MHz $N_{RB}$ | 800 MHz $N_{RB}$ | 1600 MHz $N_{RB}$ | 2000 MHz $N_{RB}$ |
|---|---|---|---|---|---|---|---|
| 120 | 32 | 64 | 128 | 256 | N.A | N.A | N.A |
| 240 | 16 | 32 | 64 | 128 | 256 | N.A | N.A |
| 480 | 8 | 16 | 32 | 64 | 128 | 256 | N.A |
| 960 | 4 | 8 | 16 | 32 | 64 | 128 | 160 |

When the number of PRBs according to the SCS and BW is defined as listed in [Table 10], it may not be easy to reuse the PUCCH formats introduced in legacy NR or NR-U. Accordingly, the present disclosure proposes an enhanced PUCCH format and an enhanced initial PUCCH resource set for FR4. Meanwhile, an actual number of PRBs according to the SCS and BW may be different from the number of PRBs of [Table 10]. However, the following proposed methods may be easily extended and applied based on a finally determined number of PRBs.

In the FR4 area (e.g., a band above 52.6 GHz), power with which one node is capable of maximally transmitting signals is limitedly regulated together with PSD regulation. For example, one node may use power of a maximum of 40 dBm. Therefore, maximum power that may be transmitted in one PRB according to each SCS may be determined in consideration of the PSD regulation and maximum power limit. A maximum number of PRBs in which power is maximally allocated according to each SCS without exceeding the maximum power limit may be calculated as listed in [Table 11], [Table 12], and [Table 13]. [Table 11] shows the case in which the PSD regulation is 23 dBm/1 MHz and [Table 12] shows the case in which the PSD regulation is 13 dBm/1 MHz.

TABLE 11

| SCS (kHz) | 1 PRB BW (MHz) | 1 PRB TX power (dBm) | # of PRBs | Total Tx power (dBm) |
|---|---|---|---|---|
| 120 | 1.44 | 24.58 | 34 | 39.89 |
|  |  |  | 35 | 40.02 → 40 |
| 240 | 2.88 | 27.59 | 17 | 39.89 |
|  |  |  | 18 | 40.14 → 40 |
| 480 | 5.76 | 30.60 | 8 | 39.63 |
|  |  |  | 9 | 40.14 → 40 |
| 960 | 11.52 | 33.61 | 4 | 39.63 |
|  |  |  | 5 | 40.60 → 40 |

TABLE 12

| SCS (kHz) | 1 PRB BW (MHz) | 1 PRB TX power (dBm) | # of PRBs | Total Tx power (dBm) |
|---|---|---|---|---|
| 120 | 1.44 | 14.58 | 264 | 38.80 |
|  |  |  | — | — |
| 240 | 2.88 | 17.59 | 174 | 39.99 |
|  |  |  | 175 | 40.02 → 40 |
| 480 | 5.76 | 20.60 | 87 | 39.99 |
|  |  |  | 88 | 40.04 → 40 |
| 960 | 11.52 | 23.61 | 43 | 39.95 |
|  |  |  | 44 | 40.04 → 40 |

Additionally, the case in which the PSD regulation is 38 dBm/1 MHz and the maximum power limit is 55 dBm per node may be shown as in [Table 13].

TABLE 13

| SCS (kHz) | 1 PRB BW (MHz) | 1 PRB TX power (dBm) | # of PRBs | Total Tx power (dBm) |
|---|---|---|---|---|
| 120 | 1.44 | 39.58 | 34 | 54.89 |
|  |  |  | 35 | 55.02 → 55 |
| 240 | 2.88 | 42.59 | 17 | 54.89 |
|  |  |  | 18 | 55.14 → 55 |
| 480 | 5.76 | 45.60 | 8 | 54.63 |
|  |  |  | 9 | 55.14 → 55 |
| 960 | 11.52 | 48.61 | 4 | 54.63 |
|  |  |  | 5 | 55.60 → 55 |

Particularly, the number of PRBs (# of PRBs) is equally obtained in [Table 11] and [Table 13]. Here, the examples of [Table 11] and [Table 13] are based on ETSI regulatory requirements of Europe. If the number of PRBs is obtained differently from those of [Table 11] and [Table 13] through regulatory requirements of other regions, the number of PRBs obtained based on the regulatory requirements of other regions may be applied to the proposed methods of the present disclosure.

A minimum number of PRBs per SCS may be calculated in consideration of the PSD requirement and maximum power limit. In order for the BS to cause the UE to transmit the PUCCH based on maximum power, the BS needs to allocate resources in which the number of PRBs is equal to or greater than those calculated in [Table 11] to [Table 13].

Accordingly, in order to transmit the PUCCH based on the maximum power of the UE, the following methods may be proposed. In the proposed methods, a proposed number of PRBs basically represents the number of contiguous PRBs for PUCCH format 0/1/2/3/4 transmission but may be extended to an interlaced PRB type. Hereinafter, the present disclosure will propose an enhanced resource allocation method for each PUCCH format, a resource allocation method of PUCCH resources constituting an initial PUCCH resource set, and a PRB offset configuration method.

Each proposed method described below may be applied in combination with other proposed methods unless each proposed method conflicts with other proposed methods.

Prior to a description of proposed methods according to the present disclosure, the overall operation processes of the UE and the BS for implementing the proposed methods according to the present disclosure will now be described.

Figure 10:
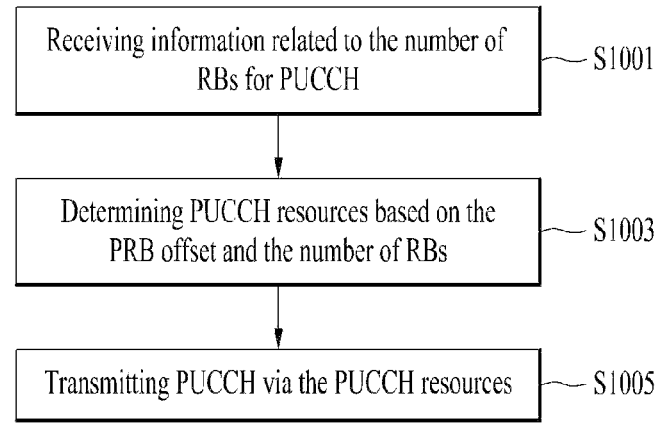
FIGS. 10 to 12 are diagrams for explaining operation processes of a UE and a BS according to an embodiment of the present disclosure.

FIG. 10 illustrates the overall operation process of the UE according to the proposed methods of the present disclosure.

Referring to FIG. 10, the UE may receive information related to the number of RBs for a PUCCH (S1001). Details on the type of the information and/or content included in the information may be based on at least one of [Proposed Method #1] to [Proposed Method #4], or [Proposed Method #6].

The UE may determine a PUCCH resource based on the number of RBs and a PRB offset (S1003). A detailed method of determining the PUCCH resource by the UE may be based on at least one of [Proposed Method #2] or [Proposed Method #5].

The UE may transmit the PUCCH through the determined PUCCH resource (S1005).

Figure 11:
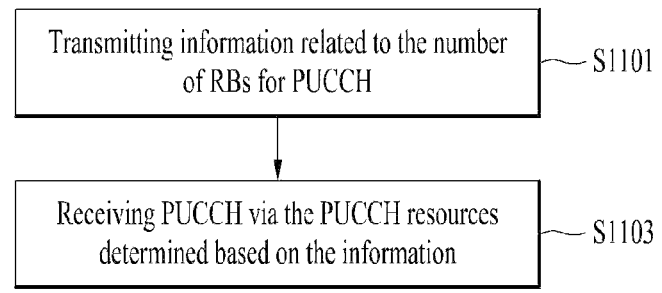

FIG. 11 illustrates the overall operation process of the BS according to the proposed methods of the present disclosure.

Referring to FIG. 11, the BS may transmit information related to the number of RBs for a PUCCH to the UE (S1101). Details on the type of the information and/or content included in the information may be based on at least one of [Proposed Method #1] to [Proposed Method #4], or [Proposed Method #6].

The BS may receive the PUCCH through a PUCCH resource (S1103). The PUCCH resource is determined based on the number of RBs and a PRB offset. A detailed method of determining the PUCCH resource may be based on at least one of [Proposed Method #2] or [Proposed Method #5].

Figure 12:
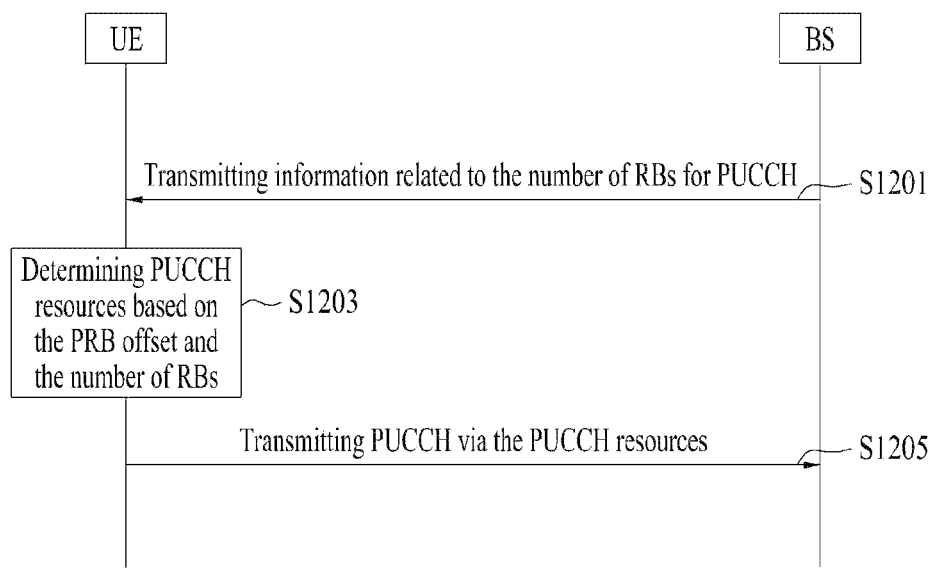

FIG. 12 illustrates the overall operation process of a network according to the proposed methods of the present disclosure.

Referring to FIG. 12, the BS may transmit information related to the number of RBs for a PUCCH to the UE (S1201). Details on the type of the information and/or content included in the information may be based on at least one of [Proposed Method #1] to [Proposed Method #4], or [Proposed Method #6].

The UE may determine a PUCCH resource based on the number of RBs and a PRB offset (S1203). A detailed method of determining the PUCCH resource by the UE may be based on at least one of [Proposed Method #2] or [Proposed Method #5].

The UE may transmit the PUCCH to the BS through the determined PUCCH resource (S1205).

The proposed methods of the present disclosure will now be described based on the contents of FIGS. 10 to 12.

Proposed Method #1

A method of configuring/indicating $N_{RB}$, which is the number of RBs to be used for PUCCH format 0/1 transmission of an initial PUCCH resource, will now be described in consideration of regulatory requirements, such as a PSD limit and a maximum output power limit, the number of available RBs in a BWP, the number of resources constituting an initial PUCCH resource set, UE multiplexing, and multiplexing between other adjacent cells through a PRB offset.

1. Embodiment #1-1

$N_{RB}$ may be configured/calculated in consideration of PUCCH resource multiplexing with other adjacent cells based on the PRB offset, such that the number of FDM resources per PUCCH resource set may not be insufficient, based on the number of available RBs according to an SCS configured for an initial BWP and a BW size of the BWP.

(1) If the BS provides information about the SCS and the BW size of the initial BWP, the UE may implicitly calculate $N_{RB}$ by [Equation 1]. In this case, the PRB offset may require scaling of the PRB offset of [Table 8] by $N_{RB}$ or $k*N_{RB}$ as will be described in [Proposed Method #2] below. In other words, the PRB offset may use the PRB offset of [Table 8] or a value obtained by scaling the PRB offset of [Table 8] by $N_{RB}$ or $k*N_{RB}$.

$$N_{RB} = \left\lfloor \frac{\text{total number of available } RBs \text{ in initial } BWP - (PRB \text{ offset}) \times 2}{\lceil 16/\text{number of initial } CS \text{ indexes} \rceil} \right\rfloor \quad \text{[Equation 1]}$$

(2) If the BS provides information about the SCS and the BW size of the initial BWP, the UE may implicitly calculate $N_{RB}$ by [Equation 2]. In [Equation 2], β serves to perform multiplexing between other adjacent cells and may be configured/indicated by the BS or defined in the specification.

$$N_{RB} = \left\lfloor \beta \times \frac{\text{total number of } RBs \text{ in initial } BWP}{\lceil 16/\text{number of initial } CS \text{ indexes} \rceil} \right\rfloor \quad \text{[Equation 2]}$$

(3) In consideration of multiplexing with other channels, the PUCCH may be transmitted using a maximum of $2^n$ RBs based on a maximum value of $2^n$ among values which is smaller than or equal to $N_{RB}$ calculated based on (1) of Embodiment #1-1 or (2) of Embodiment #1-1.

(4) In consideration of an initial PUCCH resource set to be used by other adjacent cells, $N_{RB}$ calculated based on (1) of Embodiment #1-1 or (2) of Embodiment #1-1 may be calculated with respect to all PUCCH resource set indexes and a minimum $N_{RB}$ value among the calculated $N_{RB}$ values may be used to transmit the PUCCH.

Hereinafter, [Proposed Method #1] will be described in detail.

As described above, the PSD limit or the maximum output power limit may be different according to regulatory requirements of each region/country for a specific band.

[Proposed Method #1] provides a method of configuring/indicating the number of RBs to be used for PUCCH format 0/1 transmission in consideration of the above-described regulatory requirements, the number of available RBs per SCS and BW size supported in a band above 52.6 GHz, the number of resources constituting an initial PUCCH resource set, and UE multiplexing. In the case of legacy Rel-15, PUCCH format 0/1 has been transmitted using only one RB, if a transmission method of PUCCH format 0/1 of Rel-15 is equally applied even in the band of 52.6 GHz, output power may not be sufficient and thus coverage may be insufficient.

However, if the number of RBs to be used for PUCCH transmission is excessively configured in order to solve the coverage problem, resources to be used for FDM between UEs in a cell may be insufficient. Accordingly, a method of configuring/indicating a proper number of $N_{RB}$ for the band above 52.6 GHz is needed.

For example, a minimum number of PRBs calculated in consideration of a PSD requirement and a maximum power limit for each SCS may be listed as in [Table 14]. The minimum number of PRBs of Table 14 has been calculated based on band 75 (c1) requirements of Europe.

TABLE 14

| SCS (kHz) | Minimum # of PRBs |
|---|---|
| 120 | 35 |
| 240 | 18 |
| 480 | 9 |
| 960 | 5 |

As a method of configuring PUCCH format 0/1 satisfying the number of PRBs of [Table 14], a method may be considered of configuring a sequence used for PUCCH format 0/1 as a long sequence having a length corresponding to a minimum number of PRBs calculated in consideration of the PSD requirement and the maximum output power limit.

For example, if the number of PRBs calculated in consideration of the PSD requirement and the maximum power limit is determined as listed in [Table 14], a sequence length usable for PUCCH format 0/1 may be proposed as in [Table 15]. The sequence length proposed in [Table 15] is the largest prime number among numbers smaller than the total number of REs.

In the current specification, if the sequence length is 36 or less, a sequence based on a computer generated sequence (CGS) is used. If the sequence length is 36 or more, a Zadoff-Chu (ZC) sequence is also used. Therefore, in [Table 15], since all sequence lengths according to SCSs are above 36, the ZC sequence may be used.

TABLE 15

| SCS (kHz) | Minimum # of PRBs | # of REs | Sequence length (ZC) |
|---|---|---|---|
| 120 | 35 | 420 | 419 |
| 240 | 18 | 216 | 211 |
| 480 | 9 | 108 | 107 |
| 960 | 5 | 60 | 59 |

A table for an initial PUCCH resource set of NR is as listed in [Table 8].

Referring to [Table 8], when "Set of initial CS indexes" includes two elements (e.g., indexes 0, 3, 7, and 11) in NR, since PUCCH format 0/1 is transmitted using a single PRB (i.e., since one PRB is one FDM resource), a total of 8 PRBs is needed.

When "Set of initial CS indexes" includes 3 elements (e.g., indexes 1 and 2), a total of 6 PRBs is needed. When "Set of initial CS indexes" includes 4 elements (e.g., indexes 4, 5, 6, 8, 9, 10, 12, 13, 14, and 15), a total of 4 PRBs is needed.

In FR4, the minimum PRB value may be defined as listed in [Table 14] in consideration of the PSD requirement and the maximum power limit as described above. In order to apply the minimum PRB value to the initial PUCCH resource set, the number of PRBs corresponding to one FDM resource may be configured as the minimum number of PRBs as listed in [Table 14]. As described above, when "Set of initial CS indexes" of [Table 8] includes two elements (e.g., indexes 0, 3, 7, and 11), a total of 8 FDM resources is needed. Whether the 8 FDM resources are configurable may be represented according to each SCS value and/or nominal BW (carrier/BWP BW) size as listed in [Table 16].

[Table 16] is based on the minimum number of PRBs of [Table 14].

TABLE 16

| SCS (kHz) | # of PRBs | x8 | Nominal BW (Carrier/BWP BW) (MHz) | | | | |
|---|---|---|---|---|---|---|---|
| | | | 200 | 400 | 800 | 1600 | 2000 |
| 120 | 35 | 280 | X (>132) | X (>264) | NA | NA | NA |
| 240 | 18 | 144 | X (>66) | X (>132) | O (<264) | NA | NA |
| 480 | 9 | 72 | X (>32) | X (>66) | O (<132) | O (<264) | NA |
| 960 | 5 | 40 | X (>16) | X (>32) | O (<66) | O (<132) | O (<160) |

Referring to [Table 16], when the nominal BW (carrier/BWP BW) size is 200 MHz or 400 MHz, 8 FDM resources are not secured for all SCS values.

When "Set of initial CS indexes" of [Table 8] includes 3 elements (e.g., indexes 1 and 2), a total of 6 FDM resources is needed. Whether the 6 FDM resources are configurable may be represented according to each SCS value and/or nominal BW (carrier/BWP BW) size as listed in [Table 17]. [Table 17] may be based on the minimum number of PRBs of [Table 14].

TABLE 17

| SCS (kHz) | # of PRBs | X6 | Nominal BW (Carrier/BWP BW) | | | | |
|---|---|---|---|---|---|---|---|
| | | | 200 | 400 | 800 | 1600 | 2000 |
| 120 | 35 | 210 | X (>132) | O (<264) | NA | NA | NA |
| 240 | 18 | 108 | X (>66) | O (<132) | O (<264) | NA | NA |
| 480 | 9 | 54 | X (>32) | O (<66) | O (<132) | O (<264) | NA |
| 960 | 5 | 30 | X (>16) | O (<32) | O (<66) | O (<132) | O (<160) |

Referring to [Table 17], when the nominal BW (carrier/BWP BW) size is 200 MHz, 6 FDM resources are not secured for all SCS values.

Accordingly, in FR4, if the initial PUCCH resource set of legacy NR is applied without change, FDM resources may not secured as described above. To solve this problem, the following methods may be applied in FR4 when the initial PUCCH resource set is used.

For example, when the SCS of the initial BWP is 120 kHz and the BW size is 400 MHz in [Table 16], if a PUCCH resource set in which "Set of initial CS indexes" includes two elements (e.g., indexes 0, 3, 7, and 11) is indicated (through remaining minimum system information (RMSI)), since a total of 8 FDM resources is needed (i.e., $8*N_{RB}$ PRBs are needed), $N_{RB}$ for PUCCH transmission may be set to 33 if only a single cell is considered based on the number 264 of available RBs in the BWP.

In order to transmit the PUCCH with the maximum output power allowed by the regulatory requirements, although at least 35 RBs should be used, 33 RBs, which is smaller than 35 RBs, are used to match the BW size of the initial BWP and the number of available FDM resources to 8.

However, in reality, since multiplexing (e.g., FDM) with an initial PUCCH resource set used by other adjacent cells should be considered, it is necessary to configure PUCCH resources using the remaining RBs except for as many RBs as PRB offset*2 of the initial PUCCH resource set indicated through the RMSI in consideration of RBs to be used in other cells among the total number of available RBs in the initial BWP. Therefore, $N_{RB}$=17 should be derived by substituting the above-described example into [Equation 1] and/or [Equation 2].

In [Equation 1] of (1) of Embodiment #1-1, since the PRB offset value is represented as a function of $N_{RB}$, an effect similar to applying the PRB offset for multiplexing between other adjacent cells may be derived as in [Equation 2] of (2) of Embodiment #1-1 using β which may be configured/indicated by the BS or defined in the specification instead of the PRB offset value of [Equation 1]. In this case, β is a value configured regardless of the PRB offset. For example, in a structure in which $2*N_{RB}$ PRBs are allocated for one PUCCH resource set, β may be set to 0.5.

In consideration of multiplexing with other channels, a maximum value of $2^n$ among values which are smaller than or equal to $N_{RB}$ calculated based on (1) of Embodiment #1-1 or (2) of Embodiment #1-1 may be determined as $2^n$ RBs used for PUCCH transmission.

For example, when the calculated $N_{RB}$ value is 33 or 22, then 32 or 16, which is a maximum value of $2^n$ smaller than 33 or 22, may be used as the number of RBs for PUCCH transmission in consideration of multiplexing with other channels.

Considering that an initial PUCCH resource set index used by other adjacent cells is unknown, $N_{RB}$ calculated based on (1) of Embodiment #1-1 or (2) of Embodiment #1-1 may be calculated for all indexes regardless of the initial PUCCH resource set index indicated by the RMSI, and a minimum $N_{RB}$ value among the calculated $N_{RB}$ values may be used as the number of RBs for PUCCH transmission.

In [Proposed Method #1], if the BS implicitly provides the information about the SCS and the BW size of the initial BWP even without separately configuring $N_{RB}$ for the UE, the UE may calculate $N_{RB}$ which makes FDM resources sufficient based on the set of initial CS indexes of the initial PUCCH resource set.

In other words, according to [Proposed Method #1], signaling complexity or overhead may not be increased because there is no need to devise additional signaling for indicating $N_{RB}$ in the contents of the existing specification or to consider addition of bits for indicating $N_{RB}$.

Proposed Method #2

A method of configuring the PRB offset of the initial PUCCH resource set associated with the number $N_{RB}$ of RBs to be used for PUCCH format 0/1 transmission will now be described.

1. Embodiment #2-1

A PRB offset to be used in a band above 52.6 GHz may be determined by scaling an existing PRB offset by $N_{RB}$, based on $N_{RB}$ which is calculated based on [Proposed Method #1] or $N_{RB}$ configured/indicated by the BS through a higher layer signal (e.g., RRC signaling) such as a system information block (SIB).

2. Embodiment #2-2

The PRB offset to be used in a band above 52.6 GHz may be determined by scaling the existing PRB offset by $k*N_{RB}$, based on $N_{RB}$ which is calculated based on [Proposed Method #1] or $N_{RB}$ configured/indicated by the BS through a higher layer signal (e.g., RRC signaling) such as an SIB.

Here, k may be a value predefined in the specification or may be configured/indicated by the BS, and 0<k<1.

As shown in [Table 8], the purpose of first introduction of the PRB offset in Rel-15 was FDM coexistence between intercells for initial PUCCH transmission. For the same reason, if the number of RBs for PUCCH transmission in a band above 52.6 GHz is configured/calculated as $N_{RB}$ as in [Proposed Method #1] or if the number of RBs for PUCCH transmission is indicated through RRC signaling, it may be necessary to enhance even the PRB offset.

Indexes 1 and 2 of [Table 8] consider FDM between two cells and indexes 4, 5, 6, 8, 9, 10, 12, 13, and 14 consider FDM between three cells. In [Table 8], indexes 0, 3, 7, and 11 consider an extreme channel delay situation such as a cell-edge UE and index 15 considers a special cell deployment situation.

Specially, in indexes 1 and 2 of [Table 8], since three PRBs are allocated for one PUCCH resource set, two cells may be multiplexed by FDM using PRB offset=3. In indexes 4, 5, 6, 8, 9, 10, 12, 13, and 14 of [Table 8], since two PRBs are allocated for one PUCCH resource set, three cells may be multiplexed by FDM using PRB offset=2 or 4.

Since [Table 8] has been designed by targeting full FDM between two or three cells when PUCCH format 0/1 of legacy Rel-15 is transmitted through one PRB, if the number of RBs to be used for PUCCH transmission in a band of 52.6 GHz is increased, it is necessary to scale up a current PRB offset of an interval of 2/3/4 by $N_{RB}$ as in Embodiment #2-1.

For example, if the SCS of the initial BWP is configured as 120 kHz, the BW size is configured as 200 MHz, and the PUCCH resource set in which "set of initial CS indexes" includes three elements (e.g. indexes 1 and 2) is indicated, since a total of 6 FDM resources is required, the UE may use 6 available FDM resources (i.e., a total of 6*22 PRBs) in the initial BWP, based on the number of RBs configured/calculated as $N_{RB}$=22. In this case, the PRB offset may be configured as 66 (=22*3) by simply scaling up the PRB offset by $N_{RB}$.

Since $N_{RB}$ is a value calculated such that 16 available resources per initial PUCCH resource set are allocated from the perspective of one cell in consideration of the BW size of the initial BWP, if each of all cells uses PRBs corresponding to $N_{RB}$, FDM may not be properly performed by overlap between intercells.

Accordingly, as in Embodiment #2-2, the PRB offset may be configured to support coexistence between intercells in the form of partial FDM rather than full FDM. For example, in the case of indexes 4, 5, 6, 8, 9, 10, 12, 13, and 14 of [Table 8], if the PRB offset is configured in the form of not $2*N_{RB}$ or $4*N_{RB}$, but $1*N_{RB}$ or $2*N_{RB}$ (i.e., k=0.5), the BS may preferentially use only non-overlapped resources although there are some overlapped resources are present between intercells. For invalid PUCCH resources due to overlap of resources, the BS may add a starting symbol or further consider an OCC index, thereby securing resources. In this case, invalid resources may be present due to overlapped resources between intercells.

In legacy Rel 15 and Rel 16, since PUCCH format 0/1 has been transmitted through one PRB, one PRB index for transmitting PUCCH format 0/1 has been determined based on the PRB offset.

In contrast, since one or more PRBs are required for PUCCH format 0/1 in a band above 52.6 GHz, the PRB offset scaled according to [Proposed Method #2] may be used to determine a PRB having the lowest index (or a PRB having the highest index) among one or more PRB s.

In other words, in one or more PRBs for PUCCH format 0/1 in a band above 52.6 GHz, the PRB of the lowest index (or the PRB of the highest index) may be determined based on a PRB offset scaled according to $N_{RB}$ and as many continuous (or discontinuous) PRBs as $N_{RB}$ from the corresponding PRB may be allocated for PUCCH format 0/1.

According to [Proposed Method #2], even when a plurality of PRBs is used for PUCCH format 0/1 transmission in a band above 52.6 GHz, overlap of PRBs between different cells by FDM may be minimized using the scaled PRB offset and efficient FDM between intercells may be performed.

As described above, PUCCH format 0/1/4 of Rel-15 is PUCCH formats transmitted through one RB. However, in order to secure sufficient reliability in a high-frequency unlicensed band above 52 GHz, transmission of PUCCH format 0/1/4 (hereinafter, enhanced PUCCH format 0/1/4) using one or multiple RBs may be considered within the maximum PSD limit and the maximum output power limit allowed in regulation.

The number of RBs required to achieve maximum allowed output power with maximum PSD in the regulation may be different according to each SCS. In some cases, even if the maximum allowed output power is not completely used, it may be necessary to transmit the PUCCH using fewer RBs when considering the total number of available RBs in the BWP and multiplexing and scheduling with other signals/channels. Therefore, hereinbelow, methods of configuring a maximum $N_{RB}$ value and an allowed $N_{RB}$ value for each SCS in proportion to the SCS will be proposed.

Proposed Method #3

A method of configuring the number $N_{RB}$ of RBs for enhanced format 0/1/4 using multiple RBs will now be described.

1. Embodiment #3-1

Based on a maximum $N_{RB}$ value determined based on a specific SCS and a specific criterion (e.g., maximum output power) among SCSs supported in a B52 band (i.e., a band above 52.6 GHz), maximum $N_{RB}$ values of the other SCSs may be configured as a proportional or multiple relationship.

2. Embodiment #3-2

Allowed $N_{RB}$ values between minimum $N_{RB}$ and maximum $N_{RB}$ values defined for respective SCSs may also be configured as a proportional or multiple relationship with the SCSs. Here, the minimum $N_{RB}$ value may mean a positive integer greater than or equal to 1.

Hereinafter, [Proposed Method #3] will be described in detail.

In ETSI EN 302 567 as an example, which is a regulation document for a band of 60 GHz in Europe, a maximum PSD for SCSs that may be supported in the B52 band (i.e., a band above 52.6 GHz) is 23 dBm/MHz, and a minimum number of PRBs to achieve the maximum output power (e.g., 40 dBm) may be listed as in [Table 18]. The minimum number of PRBs of [Table 18] is calculated based on the band 75 (c1) requirements of Europe.

In order to increase the coverage and reliability of the PUCCH, it is advantageous to transmit the PUCCH using the maximum output power allowed by regulation. Accordingly, the BS may configure/indicate the number of RBs for each SCS of [Table 18] as $N_{RB}$. However, in the size of a specific active BWP, since the number of available RBs in the BWP may be limited, only the number of RBs that may be transmitted with power lower than the maximum output power may be configured/indicated as $N_{RB}$.

TABLE 18

| SCS (kHz) | minimum # of PRBs |
|---|---|
| 120 | 35 |
| 480 | 9 |
| 960 | 5 |

In [Table 18], a maximum $N_{RB}$ value for achieving the maximum output power (e.g., 40 dBm) for each SCS may not have a correlation with the SCS. In addition, $N_{RB}$ values having positive integers allowed between minimum $N_{RB}$ values defined for respective SCSs may not have a correlation with the SCSs. However, since the number of PRBs for PUCCH format 4 (PF4) should be configured to always satisfy a multiple of 2 or 3 or 5 (e.g., DFT constraint→a number that may be expressed in the form of $2^a \times 3^b \times 5^c$, where a, b, and c are positive integers), a maximum $N_{RB}$ value and an allowed $N_{RB}$ value for each SCS may be configured/indicated to have a specific relation. If there is a proportional or multiple relationship between the maximum $N_{RB}$ value and the allowed $N_{RB}$ value for each SCS, only the maximum $N_{RB}$ value and allowed $N_{RB}$ value of a specific SCS value may be configured/indicated and values for the remaining SCSs may be calculated by the UE using the proportional or multiple relationship.

As an example of Embodiment #3-1, if the maximum $N_{RB}$ value based on the maximum output power in an SCS of 120 kHz (u=3) is 32, $N_{RB}$ values in an SCS of a 480 kHz (u=5) and an SCS of 960 kHz (u=6) may be configured/indicated as 32/4=8 and 32/8=4, respectively. Alternatively, if the maximum $N_{RB}$ value based on the maximum output power in an SCS of 960 kHz is 5, the maximum $N_{RB}$ value in an SCS of 120 kHz and the maximum $N_{RB}$ value in an SCS of 480 kHz may be configured/indicated as a proportional or multiple relationship with each SCS such as 5×8=40 and 5×2=10, respectively. The BS may configure only the maximum $N_{RB}$ value of a reference SCS, and the $N_{RB}$ values of the remaining SCSs may be calculated using a proportional or multiple relationship.

As an example of Embodiment #3-2, if the allowed $N_{RB}$ values between the minimum and maximum $N_{RB}$ values in an SCS of 960 kHz are configured/indicated as {1, a, b, . . . , z}, the allowed $N_{RB}$ values of an SCS of 120 kHz may be configured/indicated as {1, 8a, 8b, . . . , 8z}, and allowed $N_{RB}$ values in an SCS of 480 kHz may be configured/indicated as {1, 2a, 2b, . . . , 2z}. In this way, the allowed values between the minimum $N_{RB}$ value and the maximum $N_{RB}$ value for each SCS may also be configured/indicated as a proportional or multiple relationship with the SCS.

According to [Proposed Method #3], since the BS only needs to configure the minimum and maximum $N_{RB}$ values for one SCS for the UE without separately configuring the minimum and maximum $N_{RB}$ values for respective SCSs, the same configuration number may always be maintained regardless of the number of supported SCSs. In other words, since the BS only needs to indicate/configure one information about the minimum and maximum $N_{RB}$ values to/for the UE, signaling overhead may not be increased. For example, when there are four SCSs that may be used in a communication environment supported by the BS and two SCSs are actually used in a communication environment of the UE, the BS only needs to indicate/configure the minimum and maximum $N_{RB}$ values for one SCS without configuring information about the minimum and maximum $N_{RB}$ values for four SCSs. Accordingly, an unnecessary configuration may be reduced. In addition, since the UE only needs to directly calculate as many SCSs as the number of SCSs that the UE may actually use, complexity may not increase significantly.

Proposed Method #4

A method will now be described in which the UE calculates/configures, by [Equation 3], $N_{RB}$ for initial PUCCH resource (e.g., PUCCH format 0/1) transmission according to a PUCCH resource set index indicted in consideration of an initial BWP size (e.g., the number of available RBs in a BW of a BWP) and a PRB offset for intercell FDM, when there is no $N_{RB}$ value configured by the BS for the UE.

$$N_{RB,SCS} = \min\left\{N_{RB,SCS}^{Max}, \left\lfloor \frac{M}{O \times F \times 2} \right\rfloor\right\},$$ [Equation 3]

where $N_{RB,SCS}^{Max}$ may denote a maximum $N_{RB}$ value defined for each SCS of [Proposed Method #3] as the number of RBs satisfying the PSD and maximum output power requirements for each SCS.

In addition, M may denote the number of available RBs in the BWP, and O may denote the number of FDM resources (e.g., the size of a PRB offset between intercells multiplexed by FDM) required per PUCCH resource hop in a cell, calculated by the number of indexes in the set of initial CS indexes.

In addition, F denotes the number of cells multiplexed by FDM, and a constant 2 reflects frequency hopping. A PRB offset for each PUCCH resource set index may be defined as a multiple of $N_{RB}$ calculated according to [Equation 3], and $N_{RB}$ calculated based on a specific PUCCH resource set index may be applied to other PUCCH resource sets so that the same $N_{RB}$ value may be configured to be used.

Here, the $N_{RB}$ value for the initial PUCCH resource calculated and configured through [Equation 3] may be applied only to an unlicensed band. In the case of a licensed band, the proposed method may be applied as $N_{RB,SCS}^{Max}=1$.

Whether a corresponding cell is a cell operating in the licensed band or a cell operating in the unlicensed band may be indicated through SIB1 or a PBCH. For example, the UE may recognize whether the corresponding cell is a cell operating in the licensed band or a cell operating in the unlicensed band according to a 1-bit flag included in SIB1 or the PBCH.

The BS may indicate/configure $N_{RB}$ of PUCCH Format 0/1 (PF0/1) transmitted through the initial PUCCH resource to/for the UE through a higher layer signal such as an RACH configuration parameter in SIB1 (or RMSI). Otherwise, the UE may calculate/configure $N_{RB}$ of the initial PUCCH resource using [Equation 3] based on the PUCCH resource index indicated through SIB1 (or RMSI), and the BW size and the SCS of an initial BWP.

For example, referring to [Table 8] and [Table 17], when the SCS and BW size of the initial BWP are 120 kHz and 200 MHz (the number of available RBs, M=132), respectively, and index 1 or index 2 of [Table 8] is indicated through SIB1 (or RMSI), since the set of initial CS indexes includes 3 elements, the number of resources required for FDM per hop is O=3 (i.e., the size of the PRB offset is 3) and index 1 or index 2 targets FDM between 2 cells. Therefore, if F=2 is substituted into the equation, $N_{RB,120}=\text{floor}\{132/(3\times2\times2)\}=11$ may be calculated. If the SCS of the initial BWP is 480 kHz and the BW size is 400 MHz (M=66), $N_{RB,480}=\text{floor}\{66/(3\times2\times2)\}=5$ may be calculated.

As another example, when the SCS and BW size of the initial BWP are 120 kHz and 200 MHz (the number of available RBs, M=132), respectively, and one of indexes 4/5/6, indexes 8/9/10, and indexes 12/13/14 of [Table 8] is indicated through SIB1 (or RMSI), since the set of initial CS indexes includes 4 indexes, the number of resources required for FDM per hop is O=2 (i.e., the size of the PRB offset is 2) and the corresponding index targets FDM between 3 cells. Therefore, if F=3 is substituted into the equation, $N_{RB,120}=\text{floor}\{132/(3\times2\times2)\}=11$ may be calculated.

Meanwhile, $N_{RB}$ may be calculated based on a total initial BWP without considering indexes 0/3/7/11 of [Table 8] and FDM between intercells. For example, in the case of a BWP of an SCS of 120 kHz, since the set of initial CS indexes includes 2 elements, the number of resources required for FDM per hop is O=4, and the corresponding index targets FDM between 3 cells. Therefore, if F=1 corresponding to the number of FDM cells is substituted into the equation, $N_{RB,120}=\text{floor}\{132/(4\times1\times2)\}=22$ may be calculated.

However, $N_{RB}$ of PUCCH resource set indexes 0/3/7/11 calculated according to the above-described method may differ from $N_{RB}$ of other PUCCH resource set indexes 1/2/4/5/6, and a frequency diversity effect of a PUCCH close to the center of the BWP (i.e., a PUCCH mapped to the inside of the BWP) may be reduced. Therefore, the $N_{RB}$ value calculated based on indexes 1/2/4/5/6 may be equally applied even to the $N_{RB}$ value of indexes 0/3/7/11.

Index 15 is for special cell deployment. Therefore, since PUCCH resources are mapped based on a PRB offset corresponding to ¼ of the BWP size, it is assumed that only half of RBs in the total BWP are substantially available RBs to map the PUCCH resources. Therefore, in the example of the BWP of an SCS of 120 kHz, since the set of CS indexes includes 4 indexes, if the number of resources required for FDM per hop, i.e., O=2, and the number of cells multiplexed by FDM, i.e., F=1, are substituted, $N_{RB,120}=\text{floor}\{66/(2\times1\times2)\}=16$ may be calculated.

Characteristically, if $N_{RB}$ supporting full FDM between 2 or 3 cells (i.e., 16 PUCCH resources for each PUCCH resource set are mapped without overlap) is determined using [Equation 3], since the determined $N_{RB}$ value is smaller than the number of RBs when the UE performs transmission with maximum output power for each SCS, there may be a problem in terms of coverage or reliability of the PUCCH. Therefore, a specific minimum $N_{RB}$ value may be configured, and an actual $N_{RB}$ value may use a value obtained by multiplying a specific multiple by the minimum $N_{RB}$ value. Then, the PUCCH may be transmitted using higher power even when partial or full overlap occurs between PUCCH resources.

Specifically, $N_{RB}$ determined in consideration of full FDM may be determined as the minimum $N_{RB}$ value and the actual $N_{RB}$ value may be configured as one or two times the minimum $N_{RB}$ value. In this case, in [Table 8], if a PRB offset of a specific PUCCH resource set is K and the actual $N_{RB}$ value is configured as one times the minimum $N_{RB}$ value, an actual PRB offset may be determined as $\{K \times N_{RB}\}$ or $\{K \times \text{minimum } N_{RB}\}$. Then, power consumption of the UE may be reduced while supporting full FDM in which all resources do not overlap between cells.

If the actual $N_{RB}$ value is configured as twice the minimum $N_{RB}$ value, the actual PRB offset may be determined as $\{K/2 \times N_{RB}\}$ or $\{K \times \text{minimum } N_{RB}\}$. In this case, PUCCH resources supporting partial FDM in which some resources overlap each other between cells may be configured. In this case, the power consumption of the UE may slightly increase.

The above-described two FDM structures are methods applied to FDM between three cells. On the other hand, in PUCCH resource set indexes 1 and 2 in which a total of 6 resources is distributed to 2 cells by 3 resources with the minimum $N_{RB}$ value, when the actual $N_{RB}$ value is configured as twice the minimum $N_{RB}$ value, the number of FDM resources in the BWP may be 3 and may be configured to fully overlap.

Proposed Method #5

When the BS configures an initial PUCCH resource to be used in an initial access procedure of the UE, a method of configuring a plurality of PUCCH resources having different numbers of RBs as one set and a method of selecting the initial PUCCH resource to be used for PUCCH transmission in consideration of characteristics of the UE will now be described.

Embodiment #5-1

In consideration of a power class of the UE, the UE or the BS may select/indicate a PUCCH resource having a relatively large number of RBs in a PUCCH resource set including a plurality of PUCCH resources having different numbers of RBs for/to the UE having a power class allowing high power/effective isotropic radiated power (EIRP).

2. Embodiment #5-2

If the BS configures a PUCCH resource set including a plurality of PUCCH resources having the same number of N RBs (i.e., $N_{RB}=N$) and the UE or the BS may select/indicate RBs to transmit the PUCCH using all of the N RBs for/to the UE having a power class allowing high power/EIRP. For the UE having a power class in which high power/EIRP is not allowed, the UE or BS may select/indicate RBs to transmit the PUCCH using only K (N>K) RBs, which is a part of N RBs in each PUCCH resource.

As a method in which the UE or BS previously selects/indicates K RBs among N RBs, the UE or BS may, among configured $N_{RB}=N$,
- select/indicate K contiguous RBs from the lowest frequency RB in a high frequency direction,
- select/indicate K contiguous RBs from the highest frequency RB in a low frequency direction,
- match the center of N RBs and the center of K RBs, or
- determine an RB corresponding to an offset as a starting RB by indicating the offset from a specific RB (lowest/highest/center RB) and select/indicate K RBs from the starting RB in a high frequency direction or in a low frequency direction.

Here, Embodiment #5-2 may be applied only when the BS may discern the power class of the UE. The K value may be separately configured/indicated or defined in the specification. The ratio (e.g., 0.5) of K to N may be defined/configured.

3. Embodiment #5-3

When it is difficult for the BS to discern the power class of the UE, the BS may independently configure the PUCCH resource set according to the maximum power (for each maximum transmit power) with which the UE may perform transmission. Information for configuring the PUCCH resource set may include the number of RBs, RB positions, a PUCCH format, and a PUCCH duration.

Embodiment #5-4

The UE or the BS may select/indicate a PUCCH resources having a relatively large number of RBs for/to the UE located at a cell edge as compared with the UE located at a cell center by estimating the location of the UE on a cell.

(1) According to DL reception strength when the initial PUCCH is transmitted, the UE may select one PUCCH resource in a preconfigured PUCCH resource set.

(2) The BS may indicate one PUCCH resource within a preconfigured PUCCH resource set according to the reception strength of a UL signal/channel of the UE received through an RACH procedure, msgB/msg2, or msg4. In this case, a DL signal corresponding to the RACH procedure, msgB/msg2, or msg4 may be DCI for scheduling each of the RACH procedure, msgB/msg2, or msg4 or may be a message including msgB/msg2 or msg4.

Here, $N_{RB}$ for each initial PUCCH resource may be determined by applying [Proposed Method #4] above.

Hereinafter, [Proposed Method #5] will be described in detail.

A method of configuring a plurality of PUCCH resources having different numbers of RBs as one PUCCH resource set will now be described. For example, when the BS configures an initial PUCCH resource to be used in the initial access procedure of the UE, the BS may preconfigure two resources, i.e., 'PR1', which is a PUCCH resource in which $N_{RB}=\text{RB1}$, and 'PR2', which is a PUCCH resource in which $N_{RB}=\text{RB2}$ (where RB1<RB2), as one PUCCH resource set.

When the UE transmits the initial PUCCH based on the configured PUCCH resources, a PUCCH resource to be used may be indicated to the UE in consideration of the characteristics of the UE or the UE may directly select the initial PUCCH resource. For example, the power class of the UE may be considered. For example, in the case of the UE having a power class in which high power/EIRP is allowed, it is advantageous in terms of reliability and coverage to transmit the PUCCH using a PUCCH resource having a relatively larger number of RBs among the configured PUCCH resources.

Another method is to select/indicate a PUCCH resource according to a relative location of the UE on a cell. For example, since the UE located at a cell edge is relatively far from the BS, it is advantageous in terms of reliability and coverage to transmit the PUCCH using a PUCCH resource to which more RBs are allocated among the configured PUCCH resources. Here, the location of the UE on the cell may be estimated by the UE through the DL reception strength of the UE. Alternatively, the BS may estimate the location of the UE through the reception strength of a UL signal/channel such as PRACH or msgA transmitted by the UE during the RACH procedure. In this case, the BS may indicate with which $N_{RB}$ value a PUCCH resource will be used through the DCI or each message for scheduling msgB/msg2 or msg4.

Therefore, in the above example, when the PUCCH resource 'PR1' ($N_{RB}$=RB1), and the PUCCH resource 'PR2' ($N_{RB}$=RB2) (where RB1<RB2) having different $N_{RB}$ values are preconfigured by the BS, the UE having a power class in which high power/EIRP is allowed may transmit the PUCCH by selecting PR2 having more RBs among the two PUCCH resources.

As another method, when the BS configures a PUCCH resource set including a plurality of PUCCH resources having the same number of RBs, i.e., N RBs, the UE or the BS may select/indicate RBs such that the UE having a power class allowing high power/EIRP may use all of the N RBs. Alternatively, the UE or the BS may select/indicate RBs such that the UE having a power class allowing little power transmission may transmit the PUCCH using only K (N>K) RBs which are a part of the N RBs in each PUCCH resource.

As a method of selecting K RBs from among the N RBs configured by the BS, the UE may select K contiguous RBs in a high frequency direction from the lowest frequency RB among the N configured RBs. Alternatively, the UE may select K contiguous RBs in a low frequency direction from the highest frequency RB. Alternatively, the positions of the K RBs in the N RBs may be configured/indicated by matching the center RB of the N RBs with the center RB of the K RBs. In addition, if the BS indicates an offset from a specific RB (lowest/highest/center RB), the UE may determine an RB corresponding to the offset as a starting RB. In addition, the UE may use K RBs in a high frequency direction or a low frequency direction from the determined starting RB. Alternatively, the UE may be indicated to use K RBs in a high frequency direction or a low frequency direction from the determined starting RB.

Here, Embodiment #5-2 may be applied only when the BS is capable of discerning the power class of the UE. In addition, the K value may be separately configured/indicated or defined in the specification. The ratio (e.g., 0.5) of K to N may be defined/configured.

If the BS fails to discern the power class of the UE, the PUCCH resource set may be independently configured according to maximum power with which the UE may perform transmission (for each maximum transmission power). Information for configuring the PUCCH resource set may include the number of RBs, positions of the RBs, a PUCCH format, and a PUCCH duration.

When there are UE A that is relatively close to the BS and UE B that is relatively far from the BS, one of PUCCH resources in the configured PUCCH resource set may be selected/indicated as follows.

For initial PUCCH transmission, the UE may select one PUCCH resource in a PUCCH resource set preconfigured for the UE according to DL reception sensitivity. For example, since UE A is located at a relatively close distance from the BS, it is highly likely that the DL reception strength is greater than the specific value and, since UE B is located at a relatively far distance from the BS, it is highly likely that the DL reception strength is lower than the specific value.

Accordingly, UE A may select PR1 and UE B may select PR2 to transmit the PUCCH. Here, a specific threshold for determining whether the DL reception strength is high or low may be a value previously configured/indicated by the BS or defined in the specification. Alternatively, the BS may indicate to the UE one PUCCH resource within the preconfigured PUCCH resource set according to the reception sensitivity of a UL signal/channel (e.g., PRACH or msgA) of the UE received by the BS in the RACH procedure.

According to [Proposed Method #5], a PUCCH resource having an appropriate number of RBs that may guarantee the coverage and reliability of the PUCCH according to the power class of the UE and/or the location of the UE may be selected/indicated.

Proposed Method #6

A method of configuring/indicating initial PUCCH resource sets used before a dedicated PUCCH resource is configured for the UE and the number $N_{RB}$ of RBs constituting PUCCH resources in a PUCCH resource set will be described.

Embodiment #6-1

For each PUCCH resource set, $N_{RB}$ may be differently configured according to the total number of indexes in the set of initial CS indexes (hereinafter $N_{CS}$) for each initial PUCCH resource set and whether RB offset X is configured.

(1) When the BS configures/indicates $N_{RB}$=K through an SIB and does not configure RB offset X, all PUCCH resources in the initial PUCCH resource set may be configured as K RBs for transmission. In this case, a PRB offset value for FDM between cells may be scaled to a multiple of K. For example, the PRB offset for each initial PUCCH resource set defined in [Table 8] may be scaled to K/2K/3K times according to $N_{CS}$.

(2) When the BS indicates/indicates $N_{RB}$=K through the SIB and also configures/indicates RB offset X, the PUCCH resource may be configured as described in examples below according to the PUCCH resource index (hereinafter, $r_{PUCCH}$) and the $N_{CS}$ value. In this case, the PRB offset value for FDM between cells may be scaled to a multiple of K. For example, the PRB offset for each initial PUCCH resource set defined in [Table 8] may be scaled to K/2K/3K times according to $N_{CS}$.

A) When $N_{CS}$=2,
if $r_{PUCCH}$ is 0/1 or 8/9: the PUCCH resource is configured as 1) $N_{RB}$=K+2*X, 2) $N_{RB}$=K−2*X, 3) $N_{RB}$=K+X, or 4) $N_{RB}$=K−X,
if $r_{PUCCH}$ is 2/3 or 10/11: the PUCCH resource is configured as 1) $N_{RB}$=K+X, 2) $N_{RB}$=K−X, 3) $N_{RB}$=K+2*X, or 4) $N_{RB}$=K−2*X,
if $r_{PUCCH}$ is 4/5 or 12/13: the PUCCH resource is configured as 1) $N_{RB}$=K−X, 2) $N_{RB}$=K+X, 3) $N_{RB}$=K−2*X, or 4) $N_{RB}$=K+2*X,
if $r_{PUCCH}$ is 6/7 or 14/15: the PUCCH resource is configured as 1) $N_{RB}$=K−2*X, 2) $N_{RB}$=K+2*X, 3) $N_{RB}$=K−X, or 4) $N_{RB}$=K+X.

B) When $N_{CS}$=3,
if $r_{PUCCH}$ is 0/1/2 or 8/9/10: the PUCCH resource is configured as 1) $N_{RB}$=K+X or 2) $N_{RB}$=K−X,
if $r_{PUCCH}$ is 3/4/5 or 11/12/13: the PUCCH resource is configured as $N_{RB}$=K,
if $r_{PUCCH}$ is 6/7 or 14/15: the PUCCH resource is configured as 1) $N_{RB}$=K−X or 2) $N_{RB}$=K+X.

C) When $N_{CS}=4$,
  if $r_{PUCCH}$ is 0/1/2/3 or 8/9/10/11: the PUCCH resource is configured as $N_{RB}=K+X$ or 2) $N_{RB}=K-X$,
  if $r_{PUCCH}$ is 4/5/6/7 or 12/13/14/15: the PUCCH resource is configured as $N_{RB}=K-X$ or 2) $N_{RB}=K+X$.

Embodiment #6-2

Types of the number of RBs (hereinafter, '$N_{RB}$') used to transmit one PUCCH for each PUCCH resource set may be equally fixed to K, and 16 PUCCH resources in each PUCCH resource set may be equally divided into K as much as possible. Here, only values which are multiples of $N_{CS}$ of each PUCCH resource set among positive integer values that are the factors of 16 may be allowed as the K value. In addition, K and $N_{RB}$ determined by K may be defined in the specification as values or equations or may be configured/indicated by the BS.

(1) For example, the case in which K=2 and the types of $N_{RB}$ are X and Y is described.
  A) When $N_{CS}=2$ or $N_{CS}=4$,
    if $r_{PUCCH}$ is 0/1/2/3/4/5/6/7: the PUCCH resource is configured as $N_{RB}=X$,
    if $r_{PUCCH}$ is 8/9/10/11/12/13/14/15: the PUCCH resource is configured as $N_{RB}=Y$.
  B) When $N_{CS}=3$,
    if $r_{PUCCH}$ is 0/1/2/3/4/5: the PUCCH resource is configured as $N_{RB}=X$,
    if $r_{PUCCH}$ is 6/7/8/9/10/11/12/13/14/15: the PUCCH resource is configured as $N_{RB}=Y$.

(2) An FDM PUCCH resource having a different number of RBs may be configured in each of high-frequency and low-frequency regions.
  A) When $N_{CS}=2$ or $N_{CS}=4$,
    the number of RBs of 8 PUCCH resources in which ($r_{PUCCH}$ mod 8) is 0/1/2/3 is configured as $N_{RB}=X$, and the number of RBs of the remaining 8 PUCCH resources is configured as $N_{RB}=Y$.
  B) When $N_{CS}=3$
    the number of RBs of 6 PUCCH resources in which ($r_{PUCCH}$ mod 8) is 0/1/2 is configured as $N_{RB}=X$, and the number of RBs of the remaining 10 PUCCH resources is configured as $N_{RB}=Y$, and
    the number of RBs of 12 PUCCH resources in which ($r_{PUCCH}$ mod 8) is 0/1/2/3/4/5 is configured as $N_{RB}=X$, and the number of RBs of the remaining 4 PUCCH resources is configured as $N_{RB}=Y$.

3. Embodiment #6-3

When the BS configures the $N_{RB}$ value through the SIB, a step size for each PUCCH resource set may be configured as $$\Delta = \left\lfloor \frac{N_{RB}}{12/N_{CS}} \right\rfloor.$$

In addition, the $N_{RB}$ value for each PUCCH resource may be configured as follows based on the $\Delta$ value according to an FDM resource required for each PUCCH resource set. In this case, the BS may configure/indicate the step size $\Delta$ together with $N_{RB}$ or the step size for each PUCCH resource set may be predefined in the specification.

(1) The number of RBs of a PUCCH resource per hop may be configured by sequentially decreasing or increasing the number of RBs by the step size from a PUCCH resource having the maximum $N_{RB}$ value. For example, the PUCCH resource having the maximum $N_{RB}$ value may be located at the lowest frequency or at the highest frequency in each hop.

For example, for a PUCCH resource set with $N_{RB}=12$ and $N_{CS}=2$, and $\Delta=2$, when $r_{PUCCH}$ is 0/1 or 8/9, $N_{RB}=12$; when $r_{PUCCH}$ is 2/3 or 10/11, for and $N_{RB}=12-2=10$; when $r_{PUCCH}$ is 4/5 or 12/13, $N_{RB}=10-2=8$; and when $r_{PUCCH}$ is 6/7 or 14/15, $N_{RB}=8-2=6$.

(2) The number of RBs of a PUCCH resource per hop may be configured such that half of the number of resources required for FDM in each PUCCH resource set is configured as resources in which the number of RBs is sequentially decreased by the step size based on $N_{RB}$ and the other half is configured as resources in which the number of RBs is sequentially increased by the step size based on $N_{RB}$. For example, the PUCCH resource having the maximum $N_{RB}$ value may be located at the lowest frequency or at the highest frequency in each hop.

For example, if $\Delta=2$ for a set with $N_{RB}=12$ and $N_{CS}=2$, when $r_{PUCCH}$ is 0/1, $N_{RB}=12-2=10$; when $r_{PUCCH}$ is 2/3, $N_{RB}=10-2=8$; when $r_{PUCCH}$ is 4/5, $N_{RB}=8-2=6$; and when $r_{PUCCH}$ is 6/7, $N_{RB}=6-2=4$. $N_{RB}=12+2=14$ when $r_{PUCCH}$ is 8/9, and $N_{RB}=14+2=16$ when $r_{PUCCH}$ is 10/11. In addition, when $r_{PUCCH}$ is 12/13, $N_{RB}=16+2=18$, and when $r_{PUCCH}$ is 14/15, $N_{RB}=18+2=20$.

Here, in [Proposed Method #6], when the BS does not separately configure/indicate $N_{RB}$ for PUCCH transmission, the PUCCH may be transmitted by configuring a PUCCH resource with $N_{RB}=1$ similar to legacy Rel-15. In addition, the total number of RBs necessary for each PUCCH resource set may be calculated based on the sum of the numbers of RBs constituting respective PUCCH resources included in the PUCCH resource set and may be applied as the PRB offset value.

Hereinafter, [Proposed Method #6] will be described in detail.

In the case of the UE in a connected state after a radio resource control (RRC) configuration, since the BS discerns the capabilities of the UE such as the power class of the UE, the BS may configure a PUCCH resource having an appropriate number of RBs for each UE when configuring dedicated PUCCH resources.

However, before a dedicated PUCCH resource is configured as in the case in which the UE is performing an initial access procedure, the BS may not discern the capabilities of the UE such as the power class of the UE or the location of the UE on a cell.

Nevertheless, if the number of RBs of PUCCH resources included in the initial PUCCH resource set is differently configured and if the situation of the UE (e.g., the power class of the UE and/or the location of the UE on a cell) is capable of being inferred even before RRC connection, coverage and PUCCH transmission success rate may be increased by configuring/indicating a PUCCH resource having an appropriate number of RBs based on the inferred situation.

For example, as a method for the BS to select a PUCCH resource having an appropriate number of RBs for the UE, a situation of the UE such as the power class and/or the location of the UE may be inferred based on direct information included in msg1/msg3 (in the case of a 4-step RACH) or msgA (in the case of a 2-step RACH) exchanged during the initial access procedure between the UE and the BS or based on the reception sensitivity of a signal/channel received by the BS from the UE.

Even when the UE is performing the RACH procedure, if the BS discerns the situation of the UE in advance, the BS may indicate a PUCCH resource having a specific number of RBs in the initial PUCCH resource set through a UL grant scheduling msg4.

For this purpose, the first method is to equally or differently configure all $N_{RB}$ values for respective PUCCH resources in the PUCCH resource set according to whether X, which is an RB offset, is configured. If the BS configures only $N_{RB}$=K through the SIB, all PUCCH resources in the PUCCH resource set are configured with the same number K of RBs. In this case, the number of resources required for FDM may be different for each PUCCH resource set according to an $N_{CS}$ value for each PUCCH resource set.

Therefore, regardless of whether the PRB offset is configured, the total number of PRBs of the PUCCH resources to be subjected to FDM is kept the same as $N_{RB}$ configured by the BS, and PUCCH resource groups in the PUCCH resource set may be configured to have different numbers of PRBs. Here, each PUCCH resource set may have the number of cases for $N_{RB}$ corresponding to $N_{CS}$. For example, since a PUCCH resource set with $N_{CS}$=2 requires a total of 8 FDM resources, if the PRB offset is not configured, a total of K*8 PRBs is required.

Therefore, even when PRB offset X is configured, respective PUCCH resource groups according to PUCCH resource indexes have different numbers of RBs as K+2*X/K+X/K−X/K−2*X, but the total number of RBs included in the PUCCH resource set requires K*8 which are the same as RBs when PRB offset X is not configured.

In (2) of Embodiment #6-1, a PUCCH resource is configured to have the largest number of RBs when the PUCCH resource index $r_{PUCCH}$ is 0/1 or 8/9. In contrast, this case may be mirrored such that the PUCCH resource is configured to have the largest number of RBs when the $r_{PUCCH}$ value is 6/7 or 14/15. In other words, (2) of Embodiment #6-1 has the advantage that, when only K and X are configured/indicated, each PUCCH resource included in the initial PUCCH resource set may be configured to have a different number of RBs. Further, the BS may configure appropriate K and X in consideration of the size of an initial BWP and the number of available RBs.

The second method is to divide 16 PUCCH resources included in the PUCCH resource set into K equal parts and to configure resources to have the same number of PRBs in each divided group. That is, K may be a number of cases of the types of $N_{RB}$ included in a PUCCH resource in the PUCCH resource set. Here, as K, only values that are multiples of $N_{CS}$ of each PUCCH resource set among positive integers that are factors of 16 may be allowed. In addition, K and the $N_{RB}$ values determined by K may be defined in the specification as values or equations or may be configured/indicated by the BS.

In Embodiment #6-2, when K=2 and $N_{RB}$=12, there is a total of two types of $N_{RB}$, for example, X=6 and Y=12, and $N_{CS}$=2, then 8 PUCCH resources from the first $r_{PUCCH}$ of 0 to $r_{PUCCH}$ 7 may be configured by the number of RBs, X=6, and the remaining PUCCH resources from $r_{PUCCH}$ 8 to $r_{PUCCH}$ 15 may be configured by the number of RBs, Y=12.

The third method is to configure each PUCCH resource in the PUCCH resource set to have a different number of RBs using $N_{RB}$ and the step size Δ for each PUCCH resource set. In this case, the step size Δ may be calculated based on the equation represented in Embodiment #6-3 or may be previously configured/indicated by the BS. Alternatively, the step size may be defined in the specification with respect to each PUCCH resource set.

The number of RBs of the PUCCH resource for each hop may be configured by sequentially decreasing or increasing the number of RBs by Δ based on the configured $N_{RB}$ value. The maximum number of RBs in each hop has $N_{RB}$ and the number of RBs for each PUCCH resource may be configured by decreasing or increasing $N_{RB}$ by the Δ value according to $r_{PUCCH}$. In this case, the PUCCH resource having a maximum $N_{RB}$ value may be located at the lowest frequency or at the highest frequency in each hop.

Alternatively, the number of RBs of a PUCCH resource per hop may be configured such that half of the number of resources required for FDM in each PUCCH resource set is configured as resources in which the number of RBs is sequentially decreased by the step size based on $N_{RB}$ and the other half is configured as resources in which the number of RBs is sequentially increased by the step size based on $N_{RB}$. The PUCCH resource having the maximum $N_{RB}$ value may be located at the lowest frequency or at the highest frequency in each hop.

In [Proposed Method #6], when the BS does not separately configure/indicate $N_{RB}$ for PUCCH transmission, the PUCCH resource may be configured with $N_{RB}$=1 similar to legacy Rel-15. The total number of RBs necessary for each PUCCH resource set may be calculated based on the sum of the numbers of RBs included in respective PUCCH resources in the PUCCH resource set and may be applied as the PRB offset.

According to [Proposed Method #6], even before a dedicated PUCCH resource set is configured for the UE, the BS may infer the situation of the UE such as the location of the UE based on the reception sensitivity of a UL signal received from the UE so that the number of RBs for the PUCCH resource according to the situation of the UE may be appropriately configured.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 13:
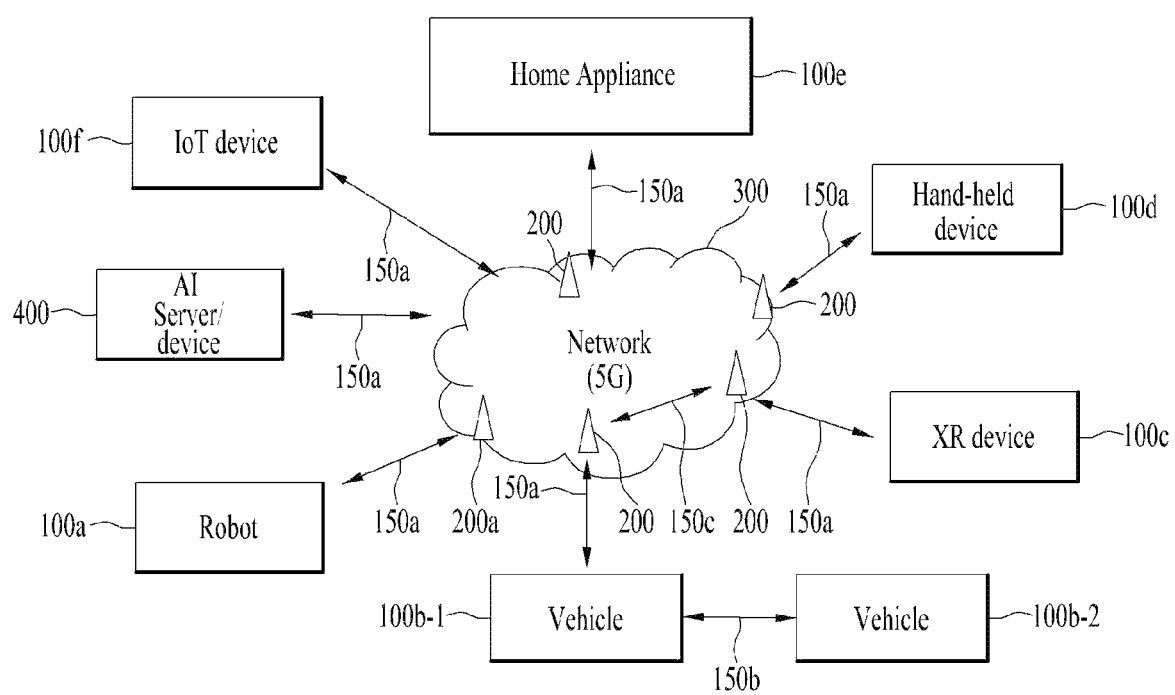
FIG. 13 illustrates an exemplary communication system applied to the present disclosure.

FIG. 13 illustrates a communication system 1 applied to the present disclosure.

Referring to FIG. 13, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul(IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 14:
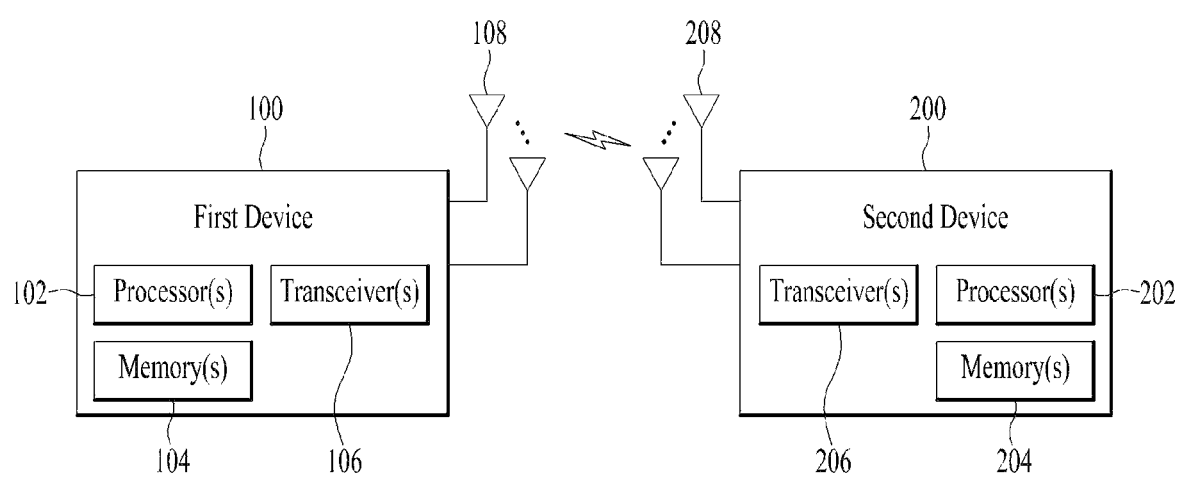
FIG. 14 illustrates an exemplary wireless device applicable to the present disclosure.

FIG. 14 illustrates wireless devices applicable to the present disclosure.

Referring to FIG. 14, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will now be described.

Although the following operations will be described based on a control operation of the processor 102 in terms of the processor 102, software code for performing such an operation may be stored in the memory 104. For example, in the present disclosure, the at least one memory 104 may store instructions or programs as a computer-readable storage medium. The instructions or the programs may cause, when executed, at least one processor operably connected to the at least one memory to perform operations according to embodiments or implementations of the present disclosure, related to the following operations.

Specifically, the processor 102 may control the transceiver 106 to receive information related to the number of RBs for a PUCCH. Details on the type of the information and/or content included in the information may be based on at least one of [Proposed Method #1] to [Proposed Method #4], or [Proposed Method #6].

The processor 102 may determine a PUCCH resource based on the number of RBs and a PRB offset. A detailed method of determining the PUCCH resource by the processor 102 may be based on at least one of [Proposed Method #2] or [Proposed Method #5].

The processor 102 may control the transceiver 106 to transmit the PUCCH through the determined PUCCH resource.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 206 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 200 and stored in the memory 204 of the second wireless device 200, according to an embodiment of the present disclosure will now be described.

Although the following operations will be described based on a control operation of the processor 202 in terms of the processor 202, software code for performing such an operation may be stored in the memory 204. For example, in the present disclosure, the at least one memory 204 may store instructions or programs as a computer-readable storage medium. The instructions or the programs may cause, when executed, at least one processor operably connected to the at least one memory to perform operations according to embodiments or implementations of the present disclosure, related to the following operations.

Specifically, the processor 202 may control the transceiver 206 to transmit information related to the number of RBs for a PUCCH. Details on the type of the information and/or content included in the information may be based on at least one of [Proposed Method #1] to [Proposed Method #4], or [Proposed Method #6].

The processor 202 may control the transceiver 206 to receive a PUCCH through a PUCCH resource. A detailed method of determining the PUCCH resource may be based on at least one of [Proposed Method #2] or [Proposed Method #5].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 15:
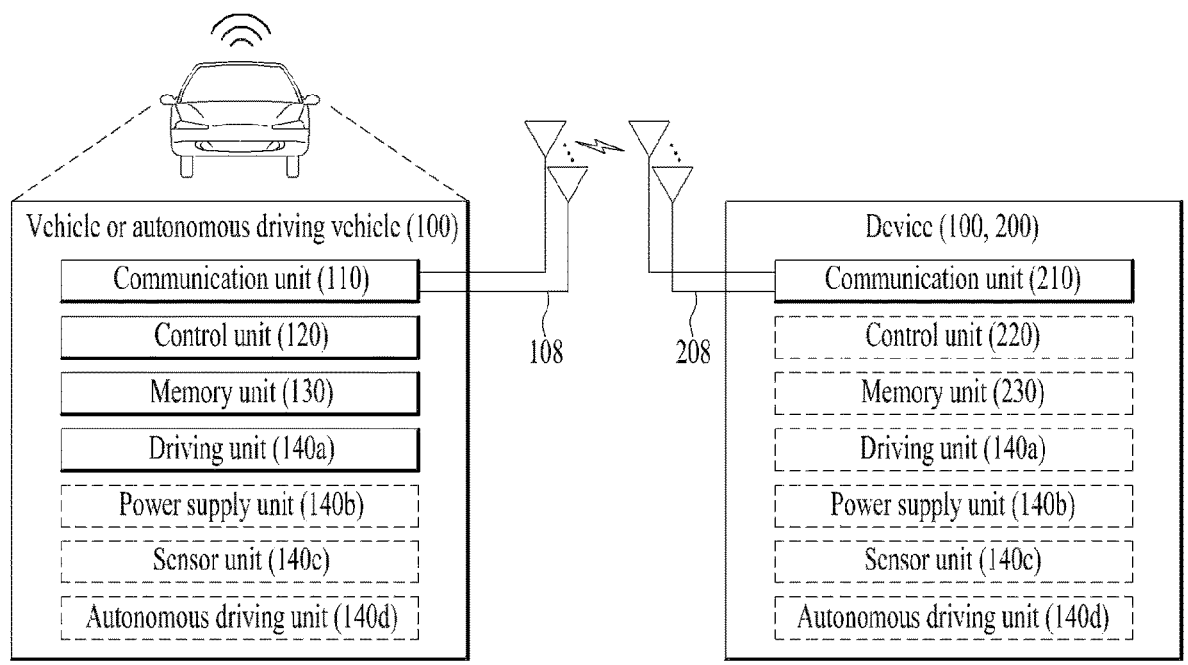
FIG. 15 illustrates an exemplary vehicle or autonomous driving vehicle applicable to the present disclosure.

FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of transmitting and receiving a UL control channel and the apparatus therefor have been described based on an example applied to a 5G NR system, the method and apparatus are applicable to various wireless communication systems in addition to the 5G NR system.

The invention claimed is:

1. A method of transmitting a physical uplink control channel (PUCCH) by a user equipment (UE) in a wireless communication system, the method comprising:

receiving information related to an index of a PUCCH resource set for the PUCCH and to a number of resource blocks (RBs) for the PUCCH; and transmitting the PUCCH through a PUCCH resource based on a first RB offset, wherein a second RB offset of the PUCCH resource set is obtained based on the index, and wherein the first RB offset is obtained by multiplying the number of RBs by the second RB offset.

2. The method of claim 1, wherein the PUCCH is based on PUCCH format 0 or PUCCH format 1.

3. The method of claim 1, wherein the information is received through a system information block (SIB).

4. The method of claim 1, wherein the PUCCH resource set is an initial PUCCH resource set used before a dedicated PUCCH resource set for the UE is configured.

5. The method of claim 1, wherein the PUCCH is transmitted in a frequency band above 52.6 GHz.

6. The method of claim 1, wherein the PUCCH is transmitted through a plurality of RBs.

7. A user equipment (UE) for transmitting a physical uplink control channel (PUCCH) in a wireless communication system, the UE comprising:

at least one transceiver;

at least one processor; and at least one memory operably connected to the at least one processor and configured to store instructions causing, when executed, the at least one processor to perform operations comprising:

receiving, through at least one transceiver, information related to an index of a PUCCH resource set for the PUCCH and to a number of resource blocks (RBs) for the PUCCH, and transmitting, through at least one transceiver, the PUCCH through a PUCCH resource based on a first RB offset, wherein a second RB offset of the PUCCH resource set is obtained based on the index, and wherein the first RB offset is obtained by multiplying the number of RBs by the second RB offset.

8. The UE of claim 7, wherein the PUCCH is based on PUCCH format 0 or PUCCH format 1.

9. The UE of claim 7, wherein the information is received through a system information block (SIB).

10. The UE of claim 7, wherein the PUCCH resource set is an initial PUCCH resource set used before a dedicated PUCCH resource set for the UE is configured.

11. The UE of claim 7, wherein the PUCCH is transmitted in a frequency band above 52.6 GHz.

12. The UE of claim 7, wherein the PUCCH is transmitted through a plurality of RBs.

13. A method of receiving a physical uplink control channel (PUCCH) by a base station (BS) in a wireless communication system, the method comprising:

transmitting information related to an index of a PUCCH resource set for the PUCCH and to a number of resource blocks (RBs) for the PUCCH; and receiving the PUCCH through a PUCCH resource based on a first RB offset, wherein the index is used to represent a second RB offset of the PUCCH resource set, and wherein the first RB offset is obtained by multiplying the number of RBs by the second RB offset.

14. A non-transitory medium which is readable by a processor and storing instructions cause the processor to perform the method of claim 1.

* * * * *